(12) United States Patent
Fukuzawa

(10) Patent No.: US 8,848,034 B2
(45) Date of Patent: Sep. 30, 2014

(54) IMAGE PROCESSING APPARATUS, CONTROL METHOD THEREOF, AND PROGRAM

(75) Inventor: Keiichi Fukuzawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 388 days.

(21) Appl. No.: 12/739,427

(22) PCT Filed: Nov. 5, 2008

(86) PCT No.: PCT/JP2008/070539
§ 371 (c)(1),
(2), (4) Date: Apr. 23, 2010

(87) PCT Pub. No.: WO2009/072375
PCT Pub. Date: Jun. 11, 2009

(65) Prior Publication Data
US 2010/0245540 A1 Sep. 30, 2010

(30) Foreign Application Priority Data
Dec. 5, 2007 (JP) ................................ 2007-315210

(51) Int. Cl.
*H04N 7/00* (2011.01)
*G06T 11/00* (2006.01)
*H04N 5/91* (2006.01)
*H04N 5/232* (2006.01)
*H04N 5/77* (2006.01)
*G03B 17/28* (2006.01)
*H04N 9/79* (2006.01)
*H04N 13/00* (2006.01)
*H04N 9/804* (2006.01)
*H04N 101/00* (2006.01)

(52) U.S. Cl.
CPC .............. *G06T 11/00* (2013.01); *H04N 9/7921* (2013.01); *H04N 5/91* (2013.01); *H04N 5/232* (2013.01); *G06T 2200/32* (2013.01); *H04N 5/772* (2013.01); *H04N 2013/0092* (2013.01); *H04N 5/23238* (2013.01); *H04N 9/8042* (2013.01); *H04N 9/8047* (2013.01); *H04N 2101/00* (2013.01); *H04N 5/23232* (2013.01); *G03B 17/28* (2013.01)
USPC .............................................. 348/39; 348/36

(58) Field of Classification Search
CPC ............................................. H04N 2013/0092
USPC .......................................... 352/69; 348/36, 39
See application file for complete search history.

(56) References Cited

U.S. PATENT DOCUMENTS 4,019,036 A * 4/1977 Hiramatsu et al. ............ 700/133
4,602,251 A * 7/1986 Sawada et al. ................ 345/590

(Continued)

FOREIGN PATENT DOCUMENTS

JP 06-121226 A 4/1994
JP 10-155109 A 6/1998

(Continued)

OTHER PUBLICATIONS

Nov. 2, 2011 Chinese Office Action, English Translation, Chinese Patent Application No. 200880119619.7.

(Continued)

*Primary Examiner* — Sath V Perungavoor
*Assistant Examiner* — Matthew J Anderson
(74) *Attorney, Agent, or Firm* — Cowan, Liebowitz & Latman, P.C.

(57) ABSTRACT

There is provided an image processing apparatus for processing at least two still images that are picked up in such a manner that two still images successively picked up have shared portions, the apparatus comprising: a synthesis unit which generates a synthesized image from the at least two still images by synthesizing the shared portions; a capturing unit which captures a plurality of frame images from a plurality of areas in the synthesized image so that a frame image is captured from an area straddling two adjacent still images across the shared portions; and a generation unit which generates a moving image in which the synthesized image is scrolled and displayed, from the plurality of frame images captured by the capturing unit.

22 Claims, 15 Drawing Sheets

(56) References Cited

U.S. PATENT DOCUMENTS

| | | | | |
|---|---|---|---|---|
| 4,920,504 | A * | 4/1990 | Sawada et al. | 345/573 |
| 5,018,023 | A * | 5/1991 | Kubota | 358/450 |
| 5,142,616 | A * | 8/1992 | Kellas et al. | 345/634 |
| 5,153,716 | A * | 10/1992 | Smith | 348/39 |
| 5,364,270 | A * | 11/1994 | Aoyama et al. | 434/55 |
| 5,601,353 | A * | 2/1997 | Naimark et al. | 353/122 |
| 5,666,459 | A * | 9/1997 | Ohta et al. | 386/224 |
| 5,841,473 | A * | 11/1998 | Chui et al. | 348/390.1 |
| 5,867,208 | A * | 2/1999 | McLaren | 725/139 |
| 5,880,778 | A * | 3/1999 | Akagi | 348/218.1 |
| 5,886,742 | A * | 3/1999 | Hibi et al. | 375/240.16 |
| 6,058,212 | A * | 5/2000 | Yokoyama | 382/236 |
| 6,416,477 | B1 * | 7/2002 | Jago | 600/447 |
| 6,542,642 | B2 * | 4/2003 | Takizawa et al. | 382/236 |
| 6,867,801 | B1 | 3/2005 | Akasawa et al. | |
| 6,891,561 | B1 * | 5/2005 | Achituv et al. | 348/36 |
| 6,982,749 | B2 * | 1/2006 | Matsui | 348/218.1 |
| 7,206,017 | B1 * | 4/2007 | Suzuki | 348/36 |
| 7,409,105 | B2 * | 8/2008 | Jin et al. | 382/284 |
| 7,412,155 | B2 | 8/2008 | Kasai | |
| 7,424,218 | B2 * | 9/2008 | Baudisch et al. | 396/322 |
| 7,428,007 | B2 * | 9/2008 | Kitaguchi et al. | 348/36 |
| 7,453,479 | B2 * | 11/2008 | Le et al. | 345/698 |
| 7,551,203 | B2 * | 6/2009 | Nakayama et al. | 348/222.1 |
| 7,577,314 | B2 * | 8/2009 | Zhou et al. | 382/284 |
| 7,580,952 | B2 * | 8/2009 | Logan et al. | 1/1 |
| 7,593,635 | B2 * | 9/2009 | Jeon | 396/322 |
| 7,596,177 | B2 * | 9/2009 | Imagawa et al. | 375/240.03 |
| 7,602,993 | B2 * | 10/2009 | Nishiyama | 382/282 |
| 7,671,894 | B2 * | 3/2010 | Yea et al. | 348/218.1 |
| 7,710,462 | B2 * | 5/2010 | Xin et al. | 348/218.1 |
| 7,728,877 | B2 * | 6/2010 | Xin et al. | 348/218.1 |
| 7,728,878 | B2 * | 6/2010 | Yea et al. | 348/218.1 |
| 8,040,952 | B2 * | 10/2011 | Park et al. | 375/240.16 |
| 8,068,693 | B2 * | 11/2011 | Sorek et al. | 382/284 |
| 8,228,994 | B2 * | 7/2012 | Wu et al. | 375/240.19 |
| 8,311,108 | B2 * | 11/2012 | Lee et al. | 375/240.12 |
| 8,350,892 | B2 * | 1/2013 | Hayashi | 348/36 |
| 8,717,412 | B2 * | 5/2014 | Linder et al. | 348/36 |
| 2002/0196852 | A1 | 12/2002 | Yamada et al. | |
| 2005/0058330 | A1 * | 3/2005 | Mitsuhashi et al. | 382/128 |
| 2005/0084175 | A1 * | 4/2005 | Olszak | 382/284 |
| 2005/0097442 | A1 * | 5/2005 | Green | 715/501.1 |
| 2005/0120094 | A1 * | 6/2005 | Tuli | 709/217 |
| 2006/0279568 | A1 * | 12/2006 | Matsumoto | 345/419 |
| 2007/0002372 | A1 * | 1/2007 | Sekizawa | 358/1.15 |
| 2007/0046771 | A1 * | 3/2007 | Luellau et al. | 347/239 |
| 2007/0132784 | A1 * | 6/2007 | Easwar et al. | 345/629 |
| 2010/0245540 | A1 * | 9/2010 | Fukuzawa | 348/36 |

FOREIGN PATENT DOCUMENTS

| | | | | |
|---|---|---|---|---|
| JP | 11-004398 | A | | 1/1999 |
| JP | 11-146243 | A | | 5/1999 |
| JP | 11-289515 | A | | 10/1999 |
| JP | 11-308618 | A | | 11/1999 |
| JP | 2000-101916 | A | | 4/2000 |
| JP | 2000-197003 | A | | 7/2000 |
| JP | 2001-016591 | A | | 1/2001 |
| JP | 2002-094870 | A | | 3/2002 |
| JP | 2002342753 | A | * | 11/2002 |
| JP | 2005-175620 | A | | 6/2005 |
| JP | 2005-197785 | A | | 7/2005 |
| JP | 2005-217902 | A | | 8/2005 |
| JP | 2005-303991 | A | | 10/2005 |
| JP | 2005-328497 | A | | 11/2005 |
| JP | 2006011862 | A | * | 1/2006 |
| JP | 2006-033353 | A | | 2/2006 |
| JP | 2006-166208 | A | | 6/2006 |
| JP | 2006-174178 | A | | 6/2006 |
| JP | 2006-270676 | A | | 10/2006 |
| JP | 2006-345400 | A | | 12/2006 |
| JP | 2007079644 | A | * | 3/2007 |

OTHER PUBLICATIONS

Jan. 16, 2012 Japanese Office Action, English Translation, Japanese Patent Application No. 2007-315210.

May 25, 2012 Japanese Office Action, English Translation, Japanese Patent Application No. 2007-315210.

* cited by examiner

IMAGE PROCESSING APPARATUS, CONTROL METHOD THEREOF, AND PROGRAM

CROSS-REFERENCE TO RELATED APPLICATIONS

This application is a national stage application of International Application No. PCT/JP2008/070539, filed Nov. 5, 2008, whose benefit is claimed and which claims the benefit of Japanese Patent Application No. 2007-315210, filed Dec. 5, 2007, the entire disclosure of which is incorporated herein by reference.

TECHNICAL FIELD

The present invention relates to an image processing apparatus, a control method of the image processing apparatus, and a program. More particularly, the present invention relates to a technique of processing a plurality of picked-up still images.

BACKGROUND ART

As a method for obtaining an image having a wider angle of view than the image pickup angle of view of an image pickup apparatus, there is a known method of picking up a plurality of images while shifting each picked-up area to small extent so that two successively picked-up images have shared portions (hereinafter referred to as a "division pickup method").

As a conventional technique relating to the division pickup method, Japanese Patent Laid-Open No. H06-121226 (FIG. 7) discloses a technique of generating a single image having a large angle of view from a panning image taken by a video camera. According to the technique of Japanese Patent Laid-Open No. H06-121226, a motion vector is calculated from a panning image by image pattern matching, a shared image area (a crosshatched portion at S5 in FIG. 7) is detected, and the shared image area and the following portion are combined (a memory 20C at S5 in FIG. 7).

Japanese Patent Laid-Open No. H06-121226 also discloses reproduction and displaying of the thus-generated synthesized image data (FIG. 20). According to the technique of Japanese Patent Laid-Open No. H06-121226, a size-reduced version of a whole synthesized image is displayed in a lower right area (sub-screen) of a display unit, while a portion (crosshatched portion of the sub-screen) of the whole synthesized image is displayed on a main screen set from a middle to a left side. In other words, a portion of the size-reduced image is enlarged and displayed on the main screen. If the size-reduced image is directly enlarged, the resolution is insufficient. Therefore, image data corresponding to a portion to be enlarged and displayed is read out from a storage medium again.

Japanese Patent Laid-Open No. 2005-197785 discloses a method for displaying a plurality of related picked-up images without synthesis (FIG. 14). According to Japanese Patent Laid-Open No. 2005-197785, a play list with which the order of reproduction of a plurality of related picked-up images is controlled is generated during image pickup. If a user selects this play list for reproduction, the user can sequentially browse picked-up images within a whole image pickup range while maintaining the resolution, without performing a complicated operation.

However, in the technique of Japanese Patent Laid-Open No. H06-121226, every time an enlarged display portion of a synthesized image is moved, corresponding image data needs to be read out from a storage medium. Therefore, it takes a time to read out image data, and there are cases in which the enlarged display portion is not smoothly moved. Also, since the user needs to select a portion to be enlarged and displayed, a complicated procedure is required to display a whole synthesized image with its original high image quality.

In the technique of Japanese Patent Laid-Open No. 2005-197785, displayed images are switched in units of a picked-up image. Therefore, it is not easy for the user to intuitively recognize the relevance between successively displayed picked-up images.

DISCLOSURE OF INVENTION

In view of such circumstances, the present invention has been achieved. A feature of the present invention is to provide a technique of enabling reproduction of a whole image from a plurality of still images that are picked up in a manner that allows two successively picked-up still images to have shared portions, while suppressing a deterioration in image quality and allowing the user to more easily recognize the image.

According to an aspect of the present invention, there is provided an image processing apparatus for processing at least two still images that are picked up in such a manner that two still images successively picked up have shared portions, the apparatus comprising: a synthesis unit which generates a synthesized image from the at least two still images by synthesizing the shared portions; a capturing unit which captures a plurality of frame images from a plurality of areas in the synthesized image so that a frame image is captured from an area straddling two adjacent still images across the shared portions; and a generation unit which generates a moving image in which the synthesized image is scrolled and displayed, from the plurality of frame images captured by the capturing unit.

According to another aspect of the present invention, there is provided a method for controlling an image processing apparatus which processes at least two still images that are picked up in such a manner that two still images successively picked up have shared portions, the method comprising: generating a synthesized image from the at least two still images by synthesizing the shared portions; capturing a plurality of frame images from a plurality of areas in the synthesized image so that a frame image is captured from an area straddling two adjacent still images across the shared portions; and generating a moving image in which the synthesized image is scrolled and displayed, from the plurality of frame images captured by the capturing.

According to another aspect of the present invention, there is provided a computer program stored in a computer-readable storage medium, the program causes an image processing apparatus which processes at least two still images that are picked up in such a manner that two still images successively picked up have shared portions, to function as: a synthesis unit which generates a synthesized image from the at least two still images by synthesizing the shared portions; a capturing unit which captures a plurality of frame images from a plurality of areas in the synthesized image so that a frame image is captured from an area straddling two adjacent still images across the shared portions; and a generation unit which generates a moving image in which the synthesized image is scrolled and displayed, from the plurality of frame images captured by the capturing unit.

According to another aspect of the present invention, there is provided an image processing apparatus for capturing a plurality of frame images from at least two still images that are picked up in such a manner that two still images successively picked up have shared portions, the apparatus comprising: a temporary storage unit which stores the at least two still images; a capturing unit which, for each of combinations of two adjacent still images across the shared portions, of the at least two still images, captures a plurality of frame images from a plurality of areas in the two adjacent still images so that a frame image is captured from an area straddling the two adjacent still images across the shared portions of the two adjacent still images; and a generation unit which generates a moving image in which the two adjacent still images are scrolled and displayed, from the plurality of frame images captured by the capturing unit.

According to another aspect of the present invention, there is provided a method for controlling an image processing apparatus for capturing a plurality of frame images from at least two still images that are picked up in such a manner that two still images successively picked up have shared portions, the method comprising: storing temporarily the at least two still images; for each of combinations of two adjacent still images across the shared portions, of the at least two still images, capturing a plurality of frame images from a plurality of areas in the two adjacent still images so that a frame image is captured from an area straddling the two adjacent still images across the shared portions of the two adjacent still images; and generating a moving image in which the two adjacent still images are scrolled and displayed, from the plurality of frame images captured by the capturing.

According to another aspect of the present invention, there is provided a computer program stored in a computer-readable storage medium for causing an image processing apparatus for capturing a plurality of frame images from at least two still images that are picked up in such a manner that two still images successively picked up have shared portions, to function as: a temporary storage unit which stores the at least two still images; a capturing unit which, for each of combinations of two adjacent still images across the shared portions, of the at least two still images, captures a plurality of frame images from a plurality of areas in the two adjacent still images so that a frame image is captured from an area straddling the two adjacent still images across the shared portions of the two adjacent still images; and a generation unit which generates a moving image in which the two adjacent still images are scrolled and displayed, from the plurality of frame images captured by the capturing unit.

Further features of the present invention will become apparent from the following description of exemplary embodiments (with reference to the attached drawings).

BEST MODE FOR CARRYING OUT THE INVENTION

Preferred embodiments of the present invention will now be described with reference to attached drawings. Each embodiment described below will be helpful in understanding a variety of concepts from the generic to the more specific.

It should be noted that the technical scope of the present invention is defined by claims, and is not limited by each embodiment described below. In addition, not all combinations of the features described in the embodiments are necessarily required for realizing the present invention.

(Embodiment 1)

An embodiment in which an image processing apparatus according to the present invention is applied to a digital camera will be described. Firstly, an image pickup process (division pickup process), and a process of generating a single synthesized image from a plurality of still images obtained by the division pickup process (hereinafter referred to as a "stitch process"), in a division pickup method will be described with reference to FIGS. 13 through 15.

Figure 13:
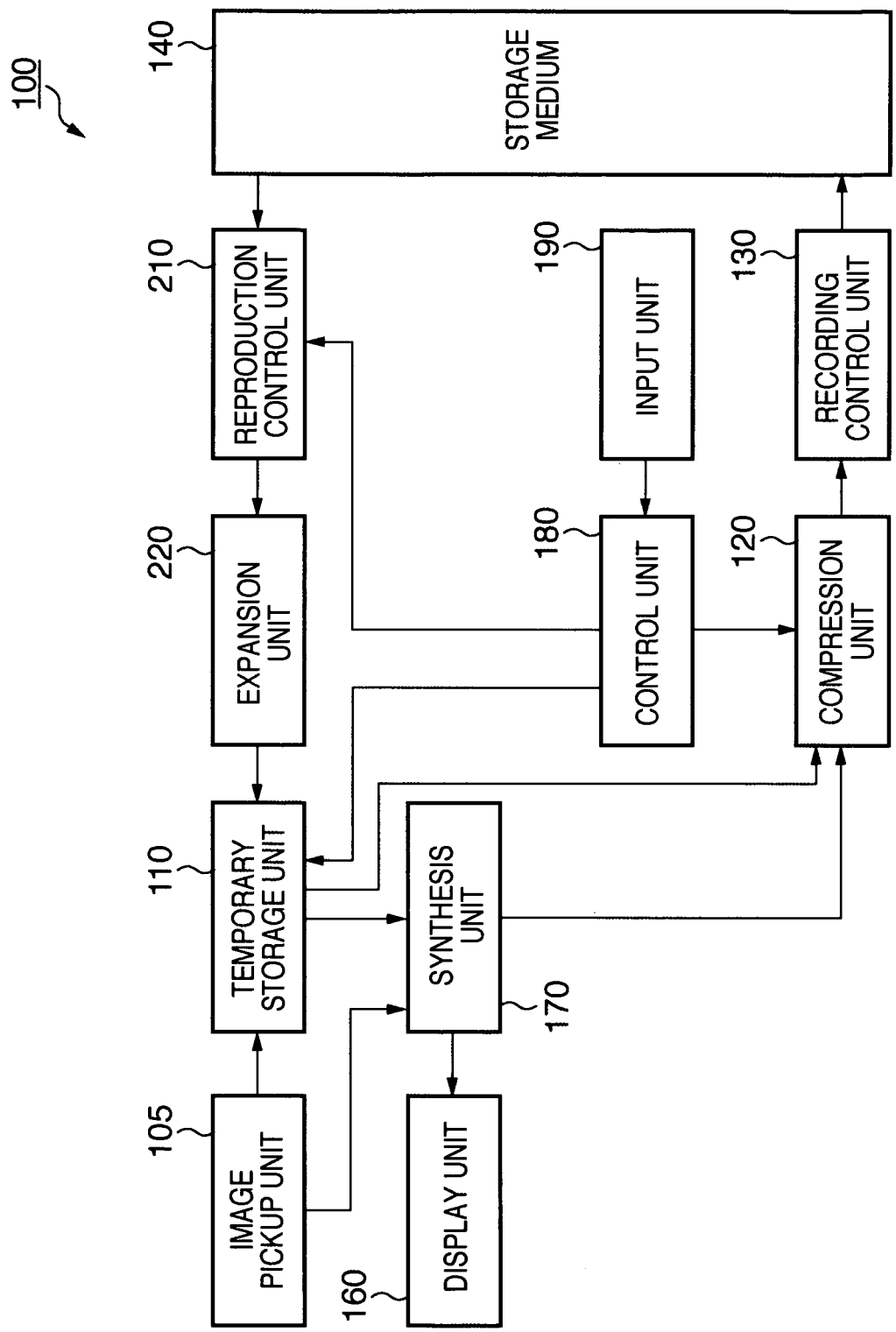
FIG. 13 is a block diagram showing a configuration of a digital camera that can execute a division pickup process and a stitch process.

FIG. 13 is a block diagram showing a configuration of a digital camera 100 capable of executing the division pickup process and the stitch process.

In FIG. 13, reference numeral 140 denotes a storage medium for recording picked-up image data or the like, including memory cards, such as a compact flash (registered trademark), an SD (registered trademark) memory card, and the like. Reference numeral 105 denotes an image pickup unit for converting an object image into digital data using a lens, an image pickup device and the like to generate image data. Reference numeral 110 denotes a temporary storage unit for temporarily storing generated image data, image data read out from the storage medium 140, or the like.

Reference numeral 120 denotes a compression unit for compressing image data by a still image compression-encoding process, such as JPEG encoding or the like. Reference numeral 130 denotes a recording control unit for causing the format of compression-encoded image data (hereinafter referred to as "compressed image data") to conform to the recording format of the storage medium 140 by converting it into the JPEG file format, for example.

Reference numeral 160 denotes a display unit for displaying image data or the like obtained by the image pickup unit 105. Reference numeral 170 denotes a synthesis unit for synthesizing two pieces of image data (e.g., image data obtained by the image pickup unit 105, and image data stored in the temporary storage unit 110). Reference numeral 180 denotes a control unit for controlling overall operation of the digital camera 100 (e.g., recording, reproduction, displaying and the like of image data), including a micro-computer or the like. Reference numeral 190 denotes an input unit with which the user gives an instruction to the control unit 180, including a menu button, a determination button or the like.

Reference numeral 210 denotes a reproduction control unit for reading out a JPEG file or the like from the storage medium 140 and extracting compressed image data or the like. Reference numeral 220 denotes an expansion unit for decoding compressed image data to obtain non-compressed image data.

Figure 14:
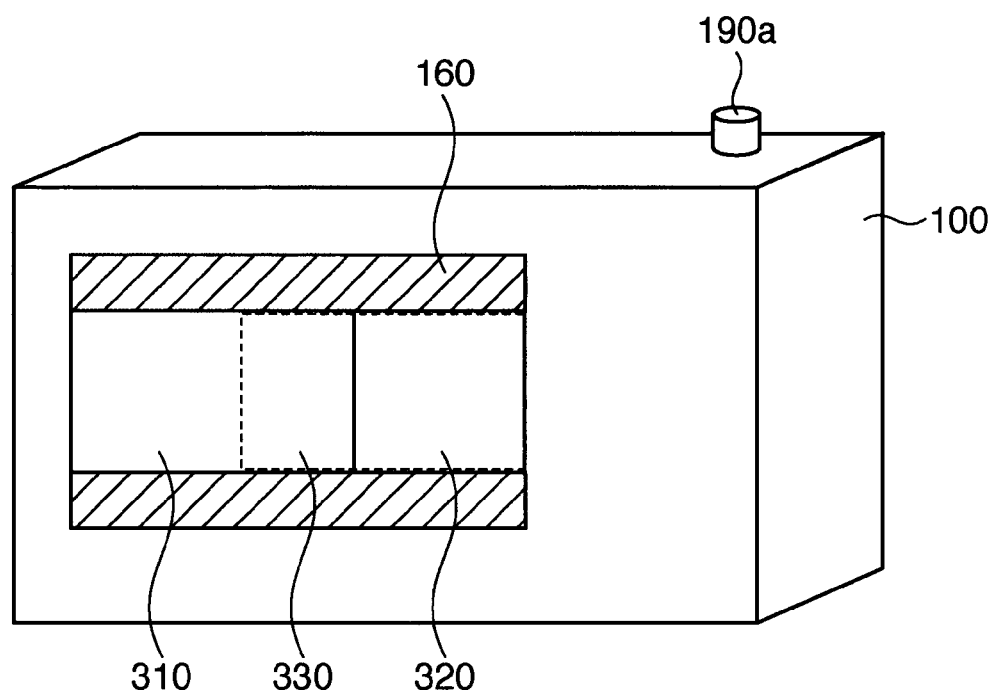
FIG. 14 is a schematic diagram showing an external appearance of the digital camera that can execute the division pickup process and the stitch process.

FIG. 14 is a diagram schematically showing an external appearance of the digital camera 100. In FIG. 14, reference numeral 190a denotes a shutter button included in the input unit 190. The user confirms a picked-up image or an object image to be picked up by viewing the display unit 160.

Before describing the division pickup process, firstly, a process of picking up separate images on a one-by-one basis (hereinafter referred to as a "normal image pickup process") will be described.

In FIG. 13, the image pickup unit 105 generates image data from an object image. The generated image data is sequentially output to the synthesis unit 170 and the temporary storage unit 110.

In the normal image pickup process, the synthesis unit 170 outputs input image data to the display unit 160 without performing a synthesis process. The display unit 160 sequentially displays image data input from the synthesis unit 170.

The user confirms an object image by viewing the display unit 160 and presses the shutter button 190a with desired timing, thereby instructing the control unit 180 to start a process of recording image data. The control unit 180 outputs a recording starting operation signal to the temporary storage unit 110 and the compression unit 120.

In the normal image pickup process, the temporary storage unit 110, when receiving the recording starting signal, outputs latest image data input from the image pickup unit 105 to the compression unit 120. The compression unit 120, when receiving the recording starting signal of the control unit 180, compresses one screen of image data input from the temporary storage unit 110 and outputs the resultant data to the recording control unit 130. The recording control unit 130 converts the format of the compressed image data input from the compression unit 120 and records the resultant data into the storage medium 140.

The process described above is the normal image pickup process that is executed by a digital camera.

Next, the division pickup process and the stitch process will be described. Here, for the sake of simplicity, the division pickup process and the stitch process that employ two picked-up images will be described as an example.

The user instructs the control unit 180 to start the division pickup process via the input unit 190 of the digital camera 100. The control unit 180 then outputs a signal indicating the start of the division pickup process to the temporary storage unit 110 and the compression unit 120. When receiving this signal, the temporary storage unit 110 operates to temporarily accumulate image data input from the image pickup unit 105. The compression unit 120 operates to add, to image data, identification data indicating that the image data has been obtained in the division pickup process. Note that the data format of the identification data may be any known data format and will not be described in detail.

Firstly, an image pickup process of the first piece of image data that is used as the starting point during the division pickup process, will be described. Note that a process similar to the normal image pickup process will not be described.

The image data generated in the image pickup unit 105 is sequentially displayed on the display unit 160. When the user presses the shutter button 190a with desired timing, a recording starting signal for the first piece of image data is input to the control unit 180.

The control unit 180 instructs the temporary storage unit 110 to execute division image pickup with the timing of the input recording starting signal. The temporary storage unit 110 stores the first piece of image data and outputs the stored image data to the compression unit 120 in accordance with the instruction from the control unit 180. The compression unit 120, when receiving the division image pickup instruction from the control unit 180, compresses input image data and further adds identification data of division image pickup to the compressed data, and outputs the resultant data to the recording control unit 130. The recording control unit 130 converts the format of the compressed image data input from the compression unit 120 and records the result data to the storage medium 140.

Next, the image pickup process of the second piece of image data in the division pickup process will be described.

As is different from the case where the first piece of image data is picked up, the temporary storage unit 110 has stored the first piece of image data. The synthesis unit 170 reads out the first piece of image data and also sequentially reads out digital data of an object image input to the image pickup unit 105, from the image pickup unit 105, and synthesizes the first piece of image data and the digital data of the object image, and displays the resultant data on the display unit 160.

Figure 15:
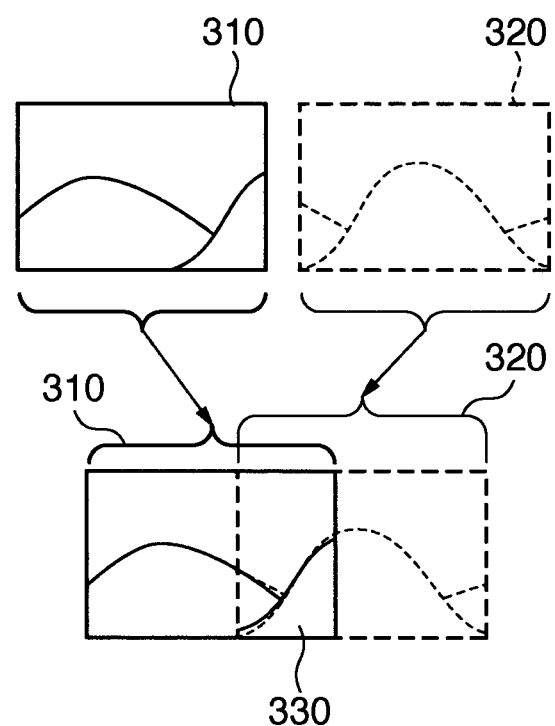
FIG. 15 is a diagram showing an outline of a synthesis process when a second piece of image data is picked up in the division pickup process.

FIG. 15 is a diagram schematically showing a synthesis process when the second piece of image data is picked up in the division pickup process. The first piece of image data 310 is stored in the temporary storage unit 110. Image data 320 is data of an object image that has been sequentially input to the image pickup unit 105. As shown in FIG. 14, the image data 310 is displayed on a left portion of the display unit 160, while the image data 320 is displayed on a right portion of the display unit 160 with a portion of the image data 320 overlapping with the image data 310 (see an overlapping portion 330).

The user operates a direction of the digital camera 100 so that the image data 310 and the image data 320 are substantially identical to each other in the overlapping portion 330, and presses the shutter button 190a. Thereby, as is similar to the first piece of image data 310, the image data 320 is recorded as the second piece of image data into the storage medium 140. The image data 310 and the image data 320 have shared portions (portions corresponding to the overlapping portion 330). Also, identification data is added to the image data 320 by the compression unit 120.

The two pieces of image data thus picked up are synthesized (stitched) and are then displayed on the display unit 160, in accordance with an instruction of the user. The image data of the synthesized image (synthesized image data) generated by the stitch process is also recorded into the storage medium 140 in accordance with an instruction of the user. Hereinafter, the detail will be described.

The user instructs, via the input unit 190, the control unit 180 to execute the stitch process. In accordance with this instruction, the control unit 180 instructs the reproduction control unit 210 to reproduce a plurality of pieces of image data obtained by the division image pickup. The reproduction control unit 210 retrieves and reads out compressed image data to be stitched to which identification data is added, with reference to file management information of the storage medium 140. The compressed image data thus read out is decoded by the expansion unit 220 and the resultant data is input to the temporary storage unit 110. For the sake of simplicity, it is here assumed that the two pieces of image data are read out and are stored into the temporary storage unit 110.

The synthesis unit 170 synthesizes shared portions of the two pieces of image data stored in the temporary storage unit 110, thereby generating a single synthesized image. The thus-generated synthesis result is displayed on the display unit 160 (see FIG. 15). Alternatively, the synthesis result may be output from a television monitor output terminal (not shown) to the outside.

Typically, the aspect ratio of the display unit 160 is different from that of the synthesized image. Therefore, as shown in FIG. 14, the size of the synthesized image is reduced so that the entirety thereof is displayed on the display unit 160. Nothing is displayed in a portion other than the synthesized image.

The synthesized image thus size-reduced is also compressed by the compression unit 120, and the resultant data is recorded into the storage medium 140 by the recording control unit 130. Thereafter, when given an instruction to execute the stitch process with respect to the same image data, the control unit 180 causes the reproduction control unit 210 to obtain the synthesized image recorded in the storage medium 140 instead of actual execution of the stitch process. Thereby, a time required to display the synthesized image is reduced.

Although it has been described above that the picked-up area is shifted from left to right in the division pickup method, the picked-up area may be shifted from right to left. Also, if the picked-up area is shifted from left to right, downward, and to left, a synthesized image having a wide angle of view in vertical and horizontal directions can be generated.

The stitch process may be performed by, for example, a personal computer (PC) instead of the digital camera 100. Particularly, when the stitch process is performed with respect to a large number of pieces of image data, a large resource (a large memory capacity, etc.) is required, and therefore, the stitch process may often be performed using a PC or the like.

As described above, when the entirety of a synthesized image is displayed on the display unit 160, the size of the synthesized image is reduced, so that the visibility decreases (see FIG. 14). Therefore, in Embodiment 1, a moving image representing a synthesized image is generated so that the entirety of the synthesized image can be easily recognized by the user.

Figure 4:
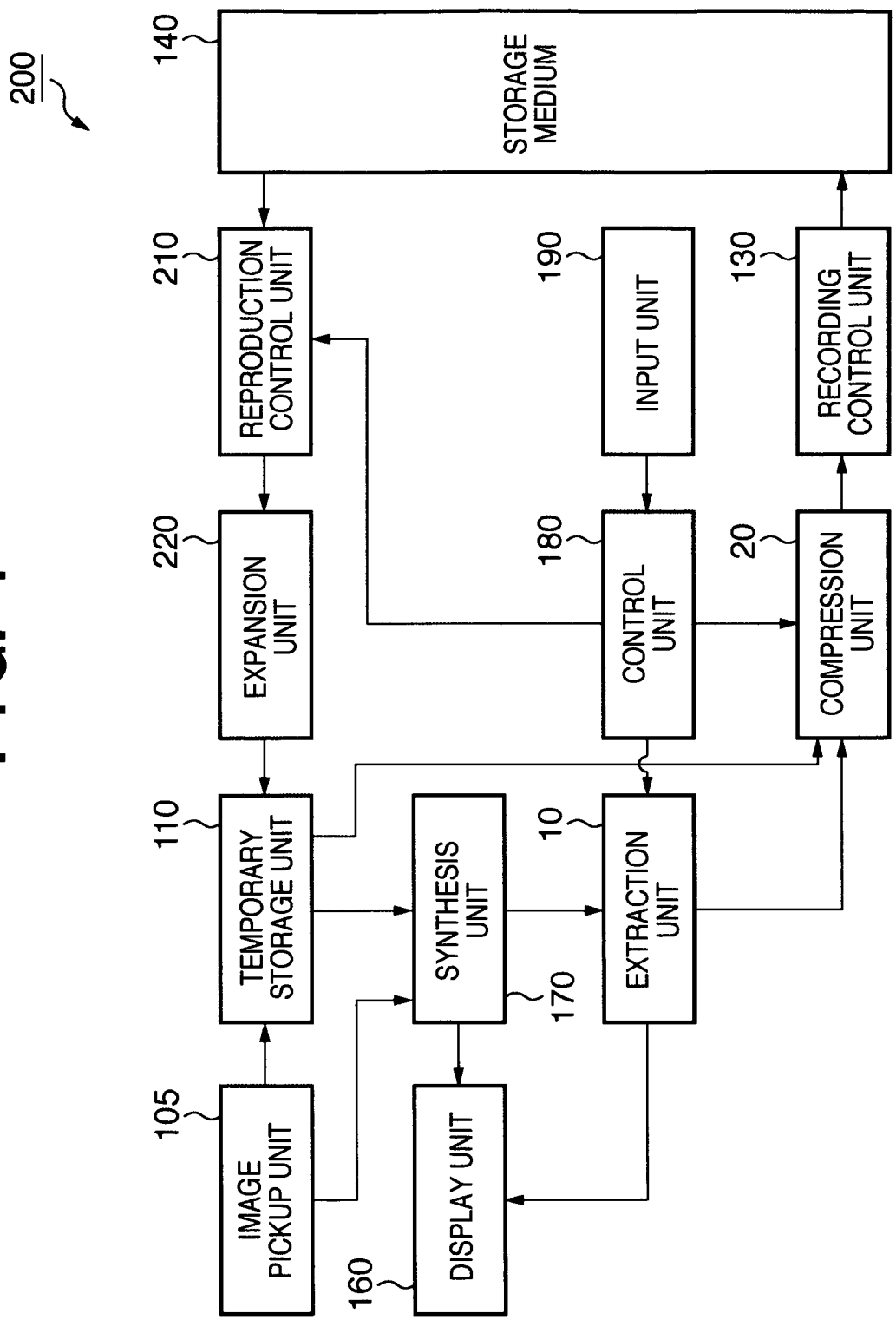
FIG. 4 is a block diagram showing a configuration of a digital camera to which an image processing apparatus according to the present invention is applied.

FIG. 4 is a block diagram showing a configuration of a digital camera 200 to which the image processing apparatus of the present invention is applied. In FIG. 4, the parts that are the same as those of the digital camera 100 (see FIG. 13) are indicated by the same reference numerals and will not be described. Note that a device that does not include an image pickup function, such as a PC or the like, may be used instead of a digital camera. Also, the display unit 160 is not necessarily required.

In FIG. 4, reference numeral 10 denotes an extraction unit for extracting a frame image for generating a moving image, from a predetermined area of a synthesized image. Reference numeral 20 denotes a compression unit for generating a moving image by applying a moving image encoding process, such as MPEG or the like, to the extracted frame image.

Next, an outline of a moving image generating process will be described with reference to FIG. 4. The user instructs, via the input unit 190, the control unit 180 to generate a moving image. The control unit 180 gives various instructions to generate a moving image to parts of the digital camera 200.

Figure 5:
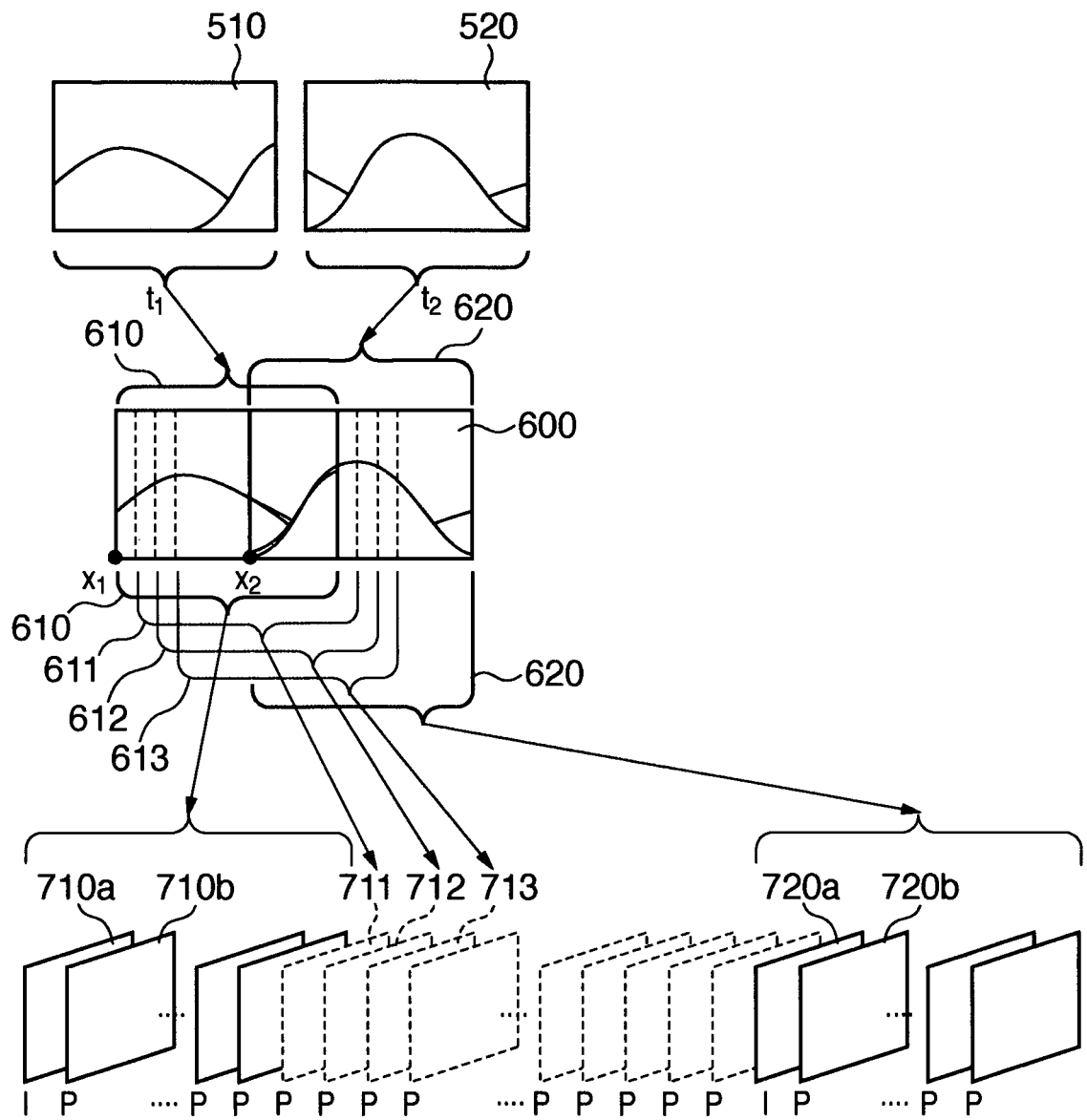
FIG. 5 is a diagram showing an outline of a moving image generating process according to Embodiment 1.

Initially, the reproduction control unit 210 reads out a plurality of pieces of compressed image data obtained by division image pickup from the storage medium 140, and outputs them to the expansion unit 220. The expansion unit 220 expands the compressed image data thus input, and stores the resultant data to the temporary storage unit 110. In FIG. 5, image data 510 is image data that was picked up at time $t_1$ and image data 520 is image data that was picked up at time $t_2$, and the image data 510 and the image data 520 each have a shared portion. Hereinafter, the image data 510 and the image data 520 to be synthesized are also referred to as original images.

The synthesis unit 170 obtains original images from the temporary storage unit 110 and synthesizes their shared portions to generate a single synthesized image 600. The extraction unit 10 extracts images from a plurality of areas of the synthesized image 600 to capture frame images. Here, the extraction unit 10 preferably extracts images having an aspect ratio that is the same as (or at least approximate to) the aspect ratio of a display device for reproducing and displaying a moving image.

As shown in FIG. 5, in this embodiment, the extraction unit 10 extracts images from extraction positions 610, 611, 612, 613, ..., and 620, and outputs the images to the compression unit 20. The display unit 160 sequentially displays the extracted images. On the other hand, the compression unit 20 MPEG-encodes the extracted images to generate a moving image, and records the moving image via the recording control unit 130 into the storage medium 140.

Next, the image extracting process will be described in detail with reference to FIGS. 1 and 2. Note that the following description is only for illustrative purposes, and various modifications fall within the scope of the present invention. A key feature of the present invention is that a larger number of frame images than the number of still images (original images) are captured so that a synthesized image can be displayed with a smaller shift spacing. Another key feature is that, for each of all combinations of two successively picked-up still images of the plurality of still images, a frame image is captured from at least one area straddling the two successively picked-up still images across a shared portion. Here, "at least one area straddling the two successively picked-up still images across a shared portion" corresponds to areas defined by the extraction positions 610 through 620, excluding the extraction positions 610 and 620 in the example of FIG. 5.

Figure 1:
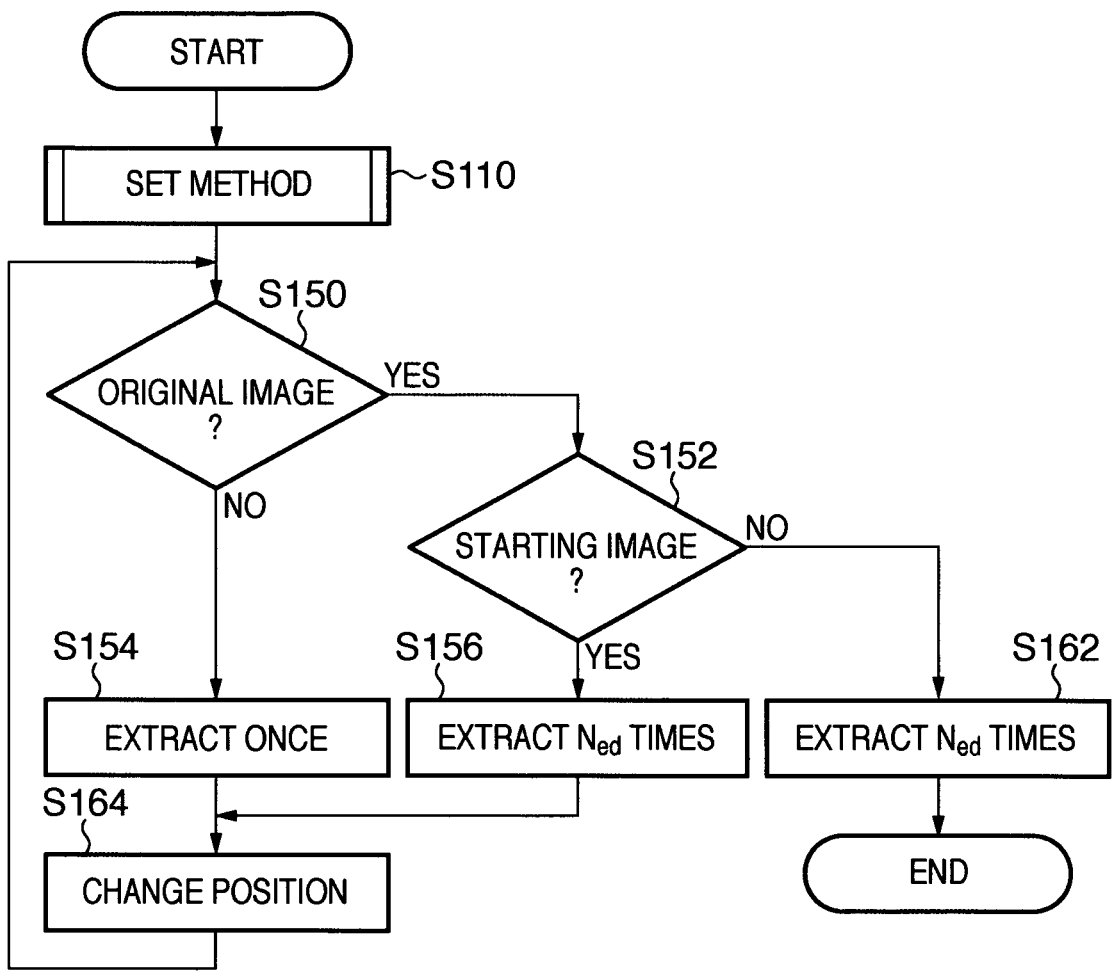
FIG. 1 is a flowchart showing a detailed flow of an image extraction process according to Embodiment 1.

In S110 of FIG. 1, the control unit 180 sets a method for extracting an image. A detailed process of S110 is shown in FIG. 2.

Figure 2:
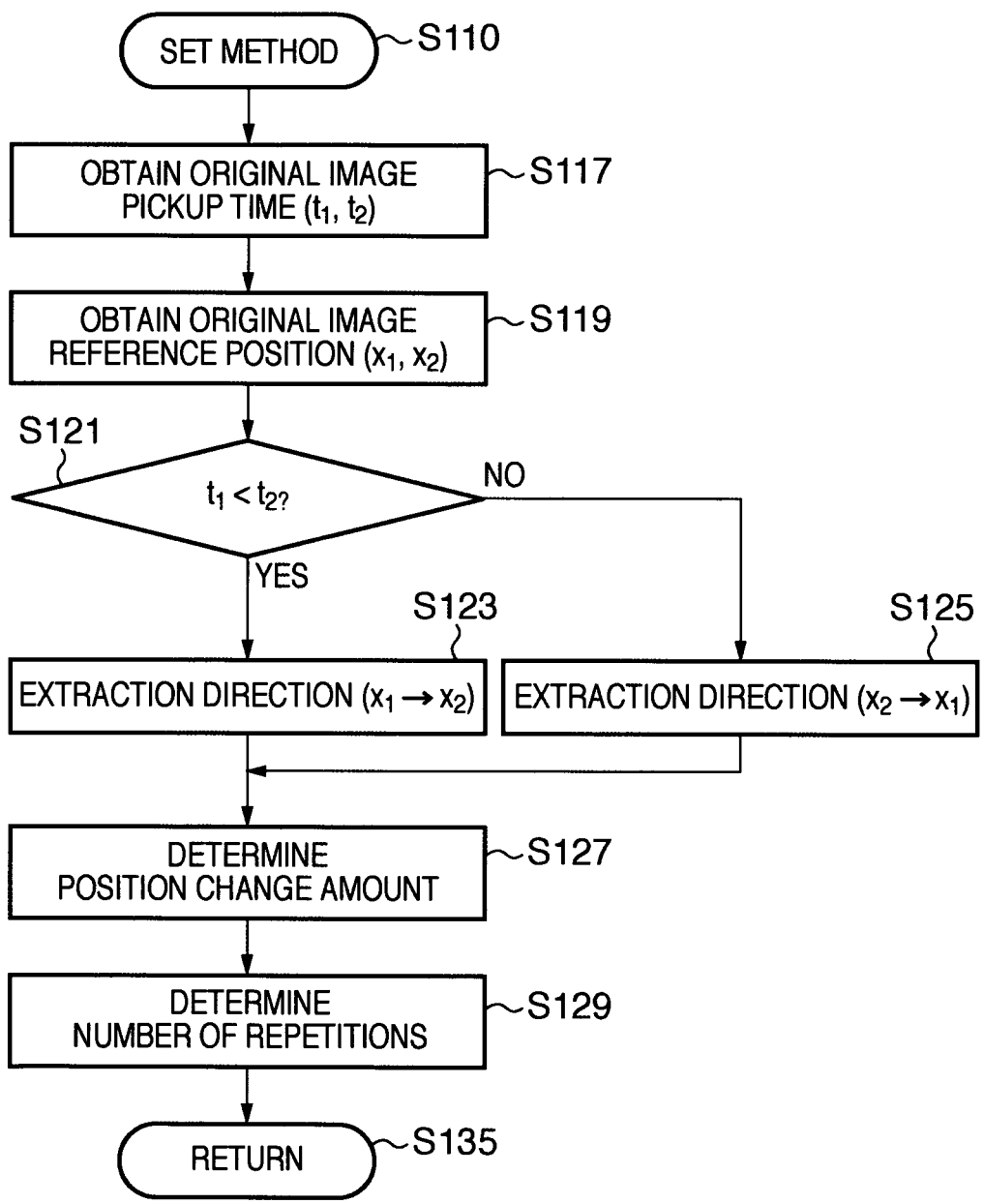
FIG. 2 is a flowchart showing a detailed flow of the image extraction process according to Embodiment 1.

In S117 of FIG. 2, the control unit 180 obtains time at which an original image to be synthesized was picked up. Image pickup time can be obtained from Exif information about an original image, for example. In this embodiment, the image pickup time of the image data 510 is $t_1$ and the image pickup time of the image data 520 is $t_2$.

In S119, the control unit 180 obtains synthesis reference position information about an original image. The synthesis reference position information refers to information indicating a position of an original image that serves as a reference in a synthesized image that is generated when the original image is synthesized. In this embodiment, the reference position of the image data 510 is $x_1$, and the reference position of the image data 520 is $x_2$.

In S121, the control unit 180 compares the image pickup time $t_1$ and $t_2$. If $t_1 < t_2$, the control unit 180 sets an extraction direction to be a direction from $x_1$ to $x_2$ in which extraction is shifted, and sets an extraction position x to be $x_1$ in S123. If otherwise, the control unit 180 sets the extraction direction to be a direction from $x_2$ to $x_1$ in which extraction is shifted, and sets the extraction position x to be $x_2$ in S125. In other words, the extraction direction is set so that extraction is performed from a previously picked-up still image to a subsequently picked-up still image.

Next, in S127, the control unit 180 sets an extraction position change amount $d_1$ in accordance with the following expression:

$$d_1 = \alpha \times |x_2 - x_1|/|t_2 - t_{set}|/fs \quad (1)$$

fs: frame sampling frequency (Hz)
$t_{set}$: division image pickup adjusting time (sec)

In Expression (1), $t_{set}$ adjusts an interval in image pickup time between two original images. Also, $\alpha$ may be a fixed value (typically, 1) or may be caused to correlate with a spacing between reference positions ($|x_2-x_1|$).

When $\alpha=1$, the extraction position change amount $d_1$ is set in accordance with an image pickup interval during division image pickup.

When $\alpha$ is caused to correlate with the reference position spacing, $\alpha$ is set to be large when the reference position spacing is large ($\alpha>1$) and small when the reference position spacing is small ($\alpha<1$) in accordance with the following expression:

$$\alpha = |x_2 - x_1|/\Delta x_{\alpha 1} \quad (2)$$

$\Delta x_{\alpha 1}$: reference position spacing set as a standard ($\alpha=1$) by the user According to Expression (2), as the image pickup interval during division image pickup increases (the shared portions of two still images successively picked up decrease), the extraction position change amount $d_1$ is set to be larger.

Finally, in S129, the control unit 180 sets the number of times $N_{ed}$ that an original image is repeatedly displayed. In an extraction process described below, if extraction of an original image is repeatedly performed a plurality of times ($N_{ed}$), the original image is displayed for a long time. Note that $N_{ed}$ may be one ($N_{ed}=1$).

By the processes described above, the setting of the extraction method is completed.

Referring back to FIG. 1, the control unit 180 determines whether or not the extraction position x coincides with a position of an original image in S150. If they coincide with each other, the process goes to S152, and if otherwise, the process goes to S154. In an initial extraction process, since the extraction position x coincides with a position of an original image ($x_1$ or $x_2$), the process goes to S152.

In S152, the control unit 180 determines whether or not an original image to which extraction is to be performed is a starting image (initially picked-up image). If the original image is a starting image, the process goes to S156, and if otherwise, the process goes to S162. In the initial process, since original image is determined to be a starting image, the process goes to S156.

In S156, the extraction unit 10 repeatedly extracts a frame image from an area of the synthesized image corresponding to the extraction position x, $N_{ed}$ times at frame updating intervals (fs). Note that the number of times of extraction may be here one. In this case, when the compression unit 20 generates a moving image, a plurality of frame images ($N_{ed}$ frame images) captured from areas corresponding to original images may be arranged in sequence to generate a moving image. Also, in S156, since a frame image is captured from an area corresponding to any of original images, the extraction unit 10 may capture an original image itself as a frame image instead of extraction of an image from a synthesized image. The original image is not affected by a deterioration in image quality due to the synthesis of shared portions. Therefore, if an original image itself is captured as a frame image, the image quality of a frame image can be improved (the same is true of S162).

As shown in FIG. 5, the extraction position 610 is a starting position, and frame images 710a, 710b, . . . , are extracted from original images and are arranged in time series at frame updating intervals (fs). Thus, an extraction starting image is extracted a plurality of times, and therefore, is displayed for a long time.

Next, in S164, the control unit 180 changes the extraction position x ($x=x+d_1$). In the example of FIG. 5, the changed extraction position x corresponds to an extraction position 611.

The determination of S150 is performed again. In this case, the extraction position x does not coincide with the position of an original image, so the process goes to S154. In S154, the extraction unit 10 extracts an image from the extraction position x of the synthesized image once. Thereby, a frame image 711 of FIG. 5 is captured. Thereafter, the processes of S164 and S154 are repeatedly executed until the extraction position coincides with the position of an original image again. Thereby, frame images 711, 712, 713, . . . of FIG. 5 are captured.

When the extraction position x coincides with the extraction position 620, the process goes from S150 to S152. Further, since the image of the extraction position 620 is not a starting image, i.e., is a final image, the process goes to S162. In S162, the extraction unit 10 performs the extraction process $N_{ed}$ times (this process is similar to that of S156 and will not be described).

By the processes described above, the extraction process is completed.

During the processes described above, as shown in FIG. 5, a group of images that are extracted and arranged in time series are sequentially displayed on the display unit 160 of FIG. 4 as described above.

Thus, by extracting and displaying a portion of a synthesized image, the entirety of the synthesized image can be displayed while securing high image quality as it was during image pickup. The initial and final frame images are displayed for a longer time than those of the other frame images. The initial and final frame images are original images, and therefore, have a less deterioration in image quality due to a distortion or the like caused by synthesis. Therefore the initial and final frame images are suitable for viewing for a long time. Moreover, also for the user, it is preferable to display an actually picked-up image for a long time when an image as it was during image pickup is reappeared.

Also, since the extraction direction or the extraction position change amount is controlled based on the image pickup time in the division pickup process, the order of image pickup is reflected on the generated moving image.

Moreover, the extraction position change amount can be caused to correlate with the extraction reference position spacing of an original image. Therefore, when an image pickup position is largely shifted during division image pickup (the spacing is large), the position change amount can be set to be large. Therefore, the speed of movement to an original image that more attention is paid increases, so that the visibility of such an image is improved.

Next, the moving image generating process in the compression unit 20 will be described with reference to FIG. 3. For the sake of simplicity, in this embodiment, the compression unit 20 arranges frame images in order in which they were extracted by the extraction unit 10 to generate a moving image. However, when the extraction unit 10 captures frame images in order that is irrelevant to the scroll direction of a synthesized image, the compression unit 20 needs to change the sequence of frame images input from the extraction unit 10 as appropriate. In either case, the compression unit 20 generates a moving image so that a synthesized image is scrolled and displayed, i.e., successive frame images have shared portions. The compression unit 20 also preferably generates a moving image so that two still image successively picked up are scrolled and displayed in a single direction from an area corresponding to a previously picked-up still image to an area corresponding to a subsequently picked-up still image.

Initially, in S182, the compression unit 20 determines whether or not a frame image to be encoded was captured from an area corresponding to an original image. If the result is positive, the process goes to S184, and if otherwise, the process goes to S186.

In S184, the compression unit 20 determines whether or not a frame image captured from an area corresponding to an original image was captured by the first one of the $N_{ed}$ extraction operations. If the result is positive, the process goes to S188, and if otherwise, the process goes to S186.

In S188, the compression unit 20 performs intra-frame coding with respect to a frame image. As shown in FIG. 5, the frame image 710a is an intra-frame coded I picture. When an original image itself is captured as a frame image of an area corresponding to the original image, the frame image is not affected by a deterioration in image quality due to the synthesis process, so that the image quality is maintained. Therefore, an intra-frame coding scheme is employed in which a larger code amount is allocated to an initial frame image so as to maintain the image quality.

On the other hand, in S186, the compression unit 20 encodes a frame image by inter-frame predictive coding or bi-directional predictive coding. For example, as shown in FIG. 5, the frame image 710b, . . . are inter-frame predictive coded (or may be bi-directional predictive coded). For frame images captured from the same extraction position, inter-frame compression is used for the second frame image and thereafter, thereby reducing the code amount.

In S194, the compression unit 20 determines whether or not all frame images have been processed. If the result is positive, the process of this flowchart is ended. If otherwise, the process returns to S182, in which the next frame image is processed.

For frame images other than an original image, a portion in which an image is somehow distorted due to the synthesis process (i.e., a shared portion) is often positioned in the vicinity of a middle of a screen. Therefore, a particularly high image quality is not obtained even if it is sought after. Therefore, as shown in FIG. 5, inter-frame predictive coding is applied to the frame images 711, 712, 713, . . .

By the processes described above, the moving image generating process is completed. Note that, according to the flowchart of FIG. 3, the frame image 720a corresponding to the second picked-up image is also intra-frame coded. However, when higher priority is given to the improvement of a compression rate, the frame image 720a may be inter-frame predictive coded or bi-directional predictive coded. Conversely, a moving image having frame images that are intra-frame coded at predetermined intervals may be generated so as to enable special reproduction (e.g., backward reproduction) of the moving image.

It has thus been described in this embodiment that frame images are arranged in order in which they were extracted by the extraction unit 10 to generate a moving image, and moving images are collectively compressed. However, since the same image is displayed for a predetermined time for the initial and final frame images of the moving image, the initial and final frames are displayed as normal still images, and only portions whose extraction positions are moved from the initial frame to the final frame may be generated as a moving image as described above and may be compressed. In this case, a play list is generated with which a reproduction control is performed during reproduction to display a still image for a predetermined time (calculated from the number of times of repeated displaying $N_{ed}$), perform moving image reproduction, and finally display a still image for a predetermined time. This case also falls within this embodiment.

As described above, according to this embodiment, the extraction unit 10 captures frame images from a plurality of areas of a synthesized image. In this case, the extraction unit 10 captures a larger number of frame images than the number of still images constituting the synthesized image. Also, for each of all combinations of two still images successively picked up, a frame image is captured from at least one area straddling the two still images across a shared portion. The compression unit 20 generates a moving image in which the synthesized image is scrolled and displayed, from the captured frame images.

Thereby, the entirety of a plurality of still images where any two still image successively picked up have shared portions can be reproduced in a manner that allows the user to more easily recognize while suppressing a deterioration in image quality.

Also, the compression unit 20 can perform smooth reproduction and displaying even if the resource of a reproduction apparatus of a moving image is limited, since a large portion of frame images is predictive coded so that the data amount of moving images can be reduced.

(Embodiment 2)

In Embodiment 2, a case where three or more original images exist will be specifically described for the sake of easy understanding, and such a case is also not excluded in Embodiment 1. Also, a technique will be described in which even if three or more original images exist, a partial synthesized image is generated by performing synthesis in units of two original images, thereby reducing a memory capacity required for generation of a moving image.

Note that the configuration of the digital camera 200 as an image processing apparatus is similar to that of Embodiment 1 and will not be described (see FIG. 4).

Figure 8:
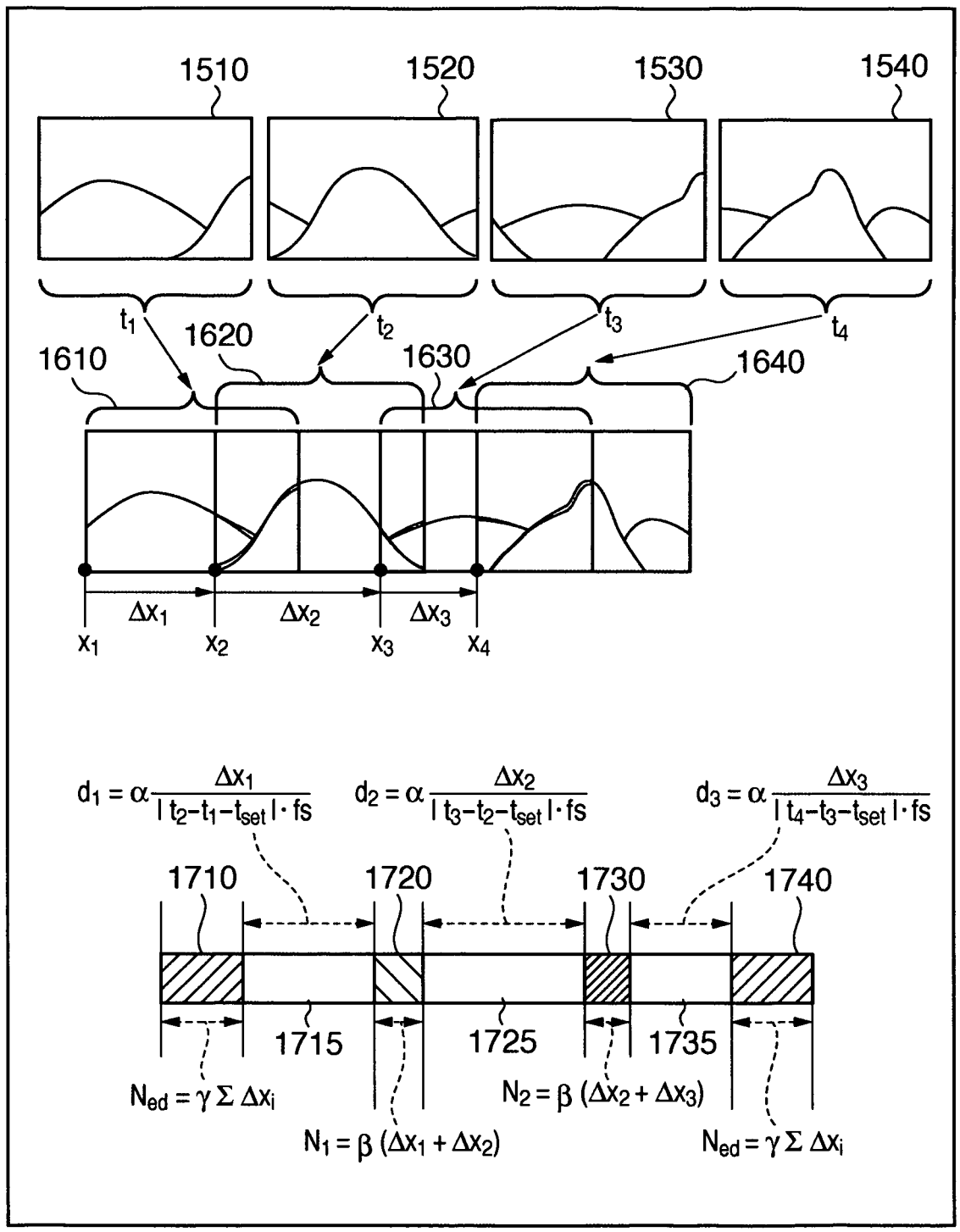
FIG. 8 is a diagram showing an outline of a moving image generating process according to Embodiment 2.

In this embodiment, as shown in FIG. 8, four pieces of image data 1510, 1520, 1530 and 1540 picked up at time $t_1$, $t_2$, $t_3$ and $t_4$, respectively, are used.

Figure 6:
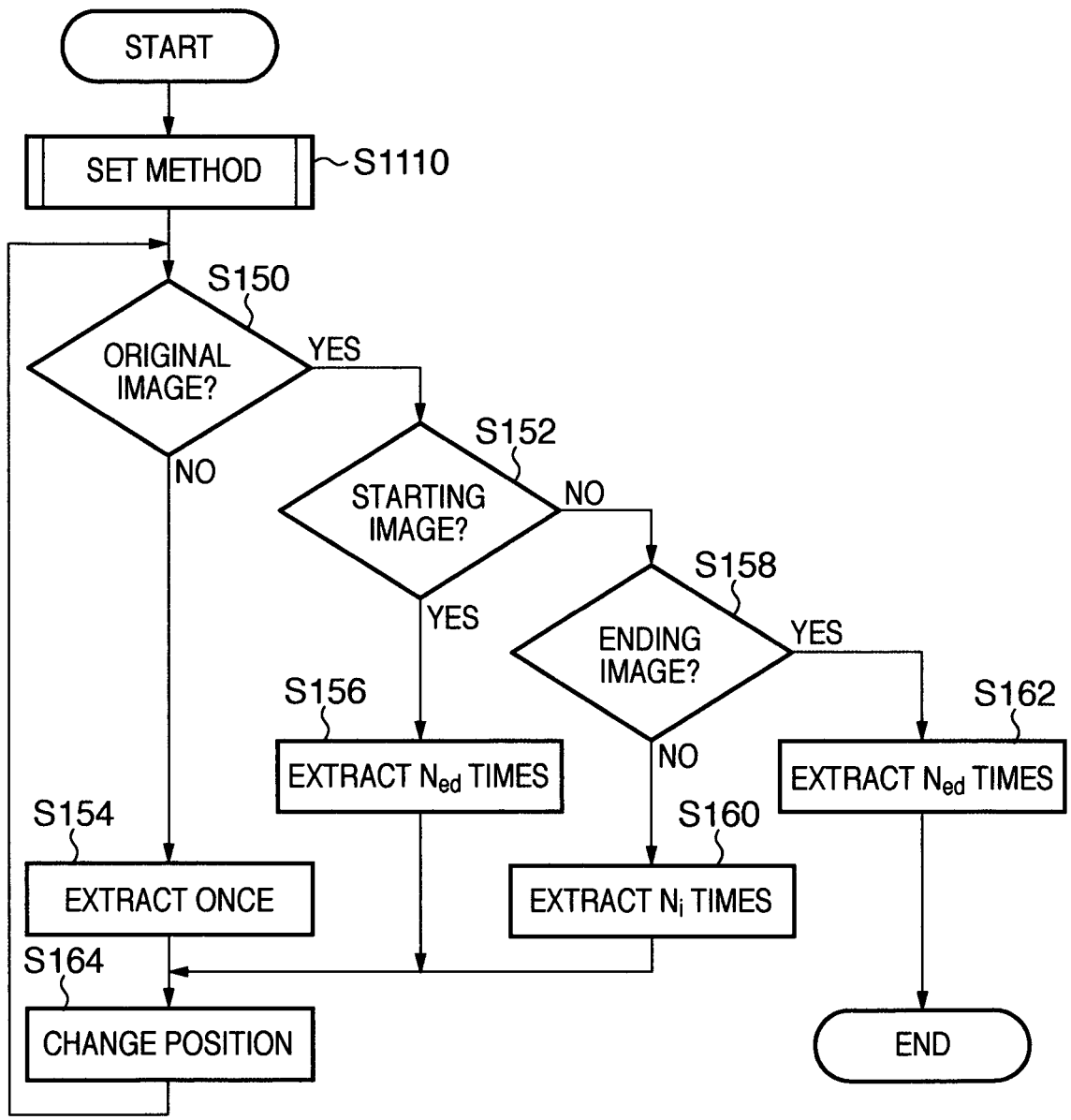
FIG. 6 is a flowchart showing a detailed flow of an image extraction process according to Embodiment 2.

An image extracting process will be described in detail with reference to FIGS. 6 and 7. In FIG. 6, steps in which processes similar to those of Embodiment 1 are performed are indicated by the same reference numerals and will not be described (see FIG. 1).

In S1110 of FIG. 6, the control unit 180 sets a method for extracting an image. The process of S1110 will be described in detail with reference to FIG. 7.

Figure 7:
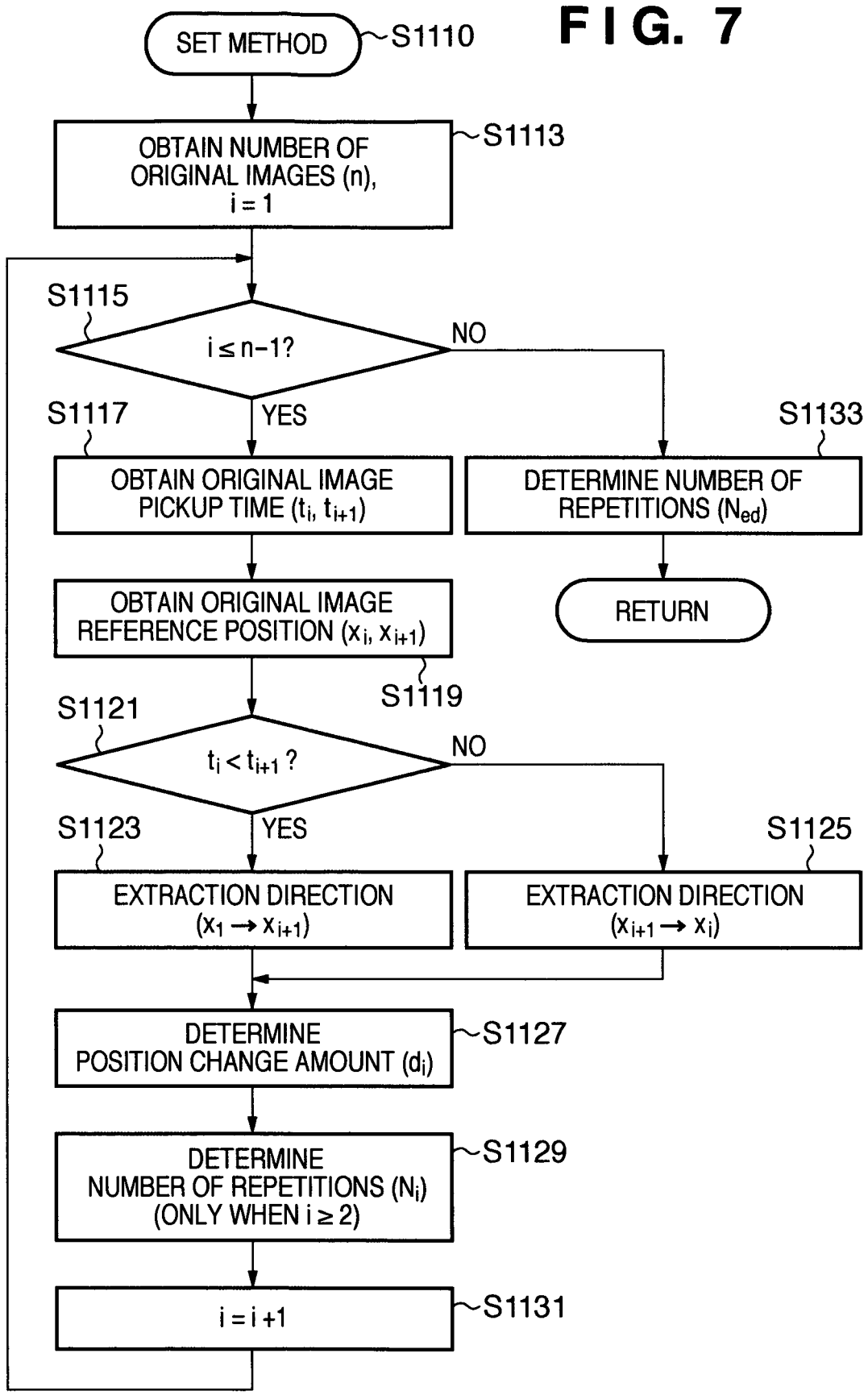
FIG. 7 is a flowchart showing a detailed flow of the image extraction process according to Embodiment 2.

In S1113 of FIG. 7, the control unit 180 obtains the number of original images to be synthesized n (n=4 in the example of FIG. 8), and initially sets a counter i to be one.

Next, in S1115, the control unit 180 determines whether or not the counter i has reached the number of original images n. If the result is negative, the process goes to S1117, and if the result is positive, the process goes to S1133.

In Embodiment 1, the value of n is two (n=2) and thus, only when i=1, the processes of S1117 through S1127 are executed. Specifically, the processes of S1117 through S1127 are similar to S117 through S127 of FIG. 2, except that they are executed when the value of i is not one. Therefore, the processes of S1117 through S1127 will not be described in detail.

In S1129, the control unit 180 sets the number of times of repetitive displaying of an original image ($N_i$) in accordance with the following expression only when i≥2.

$$N_i = \beta \times (\Delta x_{i-1} + \Delta x_i)$$

$$\Delta x_i = |x_{i+1} - x_i| \quad (3)$$

The number of repetitions $N_i$ is proportional to the magnitudes of extraction reference position spacings $\Delta x_{i-1}$ and $\Delta x_i$ of adjacent original images. In other words, the larger the magnitudes of adjacent extraction reference position spacings, the larger the number of repetitions that is set. $\beta$ is a constant of proportion.

In S1131, the control unit 180 adds one to i, and the process then returns to S1115.

In S1115, when the counter i reaches n, the process goes to S1133, in which the control unit 180 sets the number of times of repetitive displaying of an original image $N_{ed}$ in accordance with the following expression.

$$N_{ed} = \gamma \times \Sigma \Delta x_i \quad (4)$$

As can be seen from Expression (4), the number of repetitions $N_{ed}$ is set to be sufficiently larger than the number of repetitions of an intermediate original image $N_i$. $\gamma$ is a constant of proportion.

Note that, in this embodiment, $N_{ed}$ is applied only to original images that were initially and finally picked up (i=1 and n).

By the processes described above, the extraction method setting process is completed.

Referring back to FIG. 6, a portion different from Embodiment 1 (see FIG. 1) will be described. In this embodiment, in S152, when it is determined that an original image to which extraction is to be performed is not a starting image, the process goes to S158.

In S158, the control unit 180 determines whether or not an original image to which extraction is to be performed is a final image (an image finally picked up). If the result is positive, the process goes to S162, and if otherwise, the process goes to S160.

In S160, the extraction unit 10 performs extraction the number of times $N_i$ with respect to the i-th original image. In the example of FIG. 8, the image data 1520 is extracted during the first execution of the process of S160, and the image data 1530 is extracted during the second execution of the process of S160.

Note that, in FIG. 8, reference numerals 1710, 1720, 1730 and 1740 denote frame images corresponding to original images, and reference numerals 1715, 1725 and 1735 denote frame images of areas that straddle corresponding original images.

By the processes described above, extraction of frame images is completed.

Figure 3:
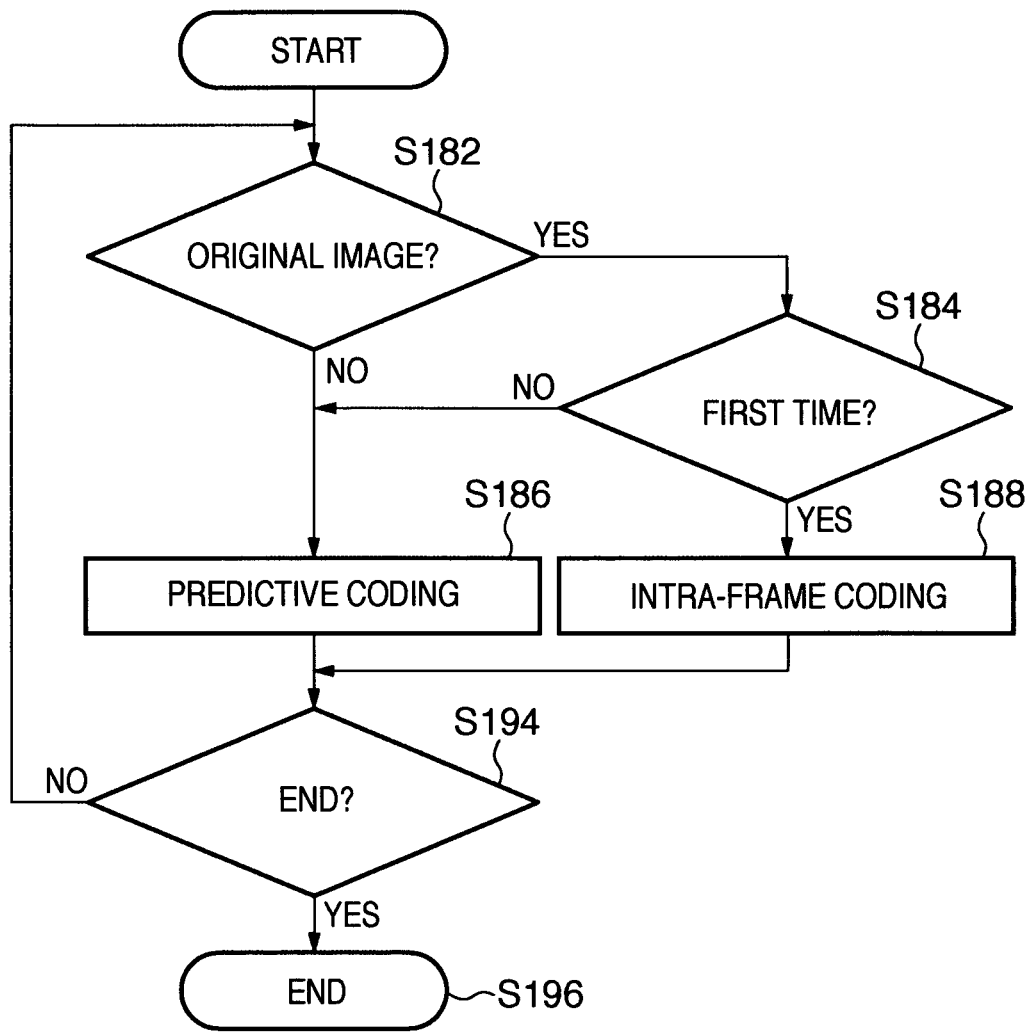
FIG. 3 is a flowchart showing a flow of a moving image generating process in a compression unit of a digital camera according to Embodiment 1.

The compression unit 20 encodes the thus-captured frame images to generate a moving image as in Embodiment 1 (see FIG. 3).

In this embodiment, for the intermediate original images (reference numerals 1720 and 1730 in FIG. 8), frame images the number of which is determined in view of an image pickup situation are extracted, so that a moving image can be displayed, depending on the degree of attention. Also, since there is a difference in the number of times of extraction between the intermediate original images and the initial and final original images (reference numerals 1710 and 1740 of FIG. 8), the initial and final images that give stronger impression during division image pickup can be displayed with a higher degree of attention.

In the example of FIG. 8, four still images that are picked up while shifting a picked-up area in a single direction (from left to right), are used. However, the shifting direction of the picked-up area is not limited to a single direction. This will be hereinafter described with reference to FIGS. 9 and 10.

Figure 9:
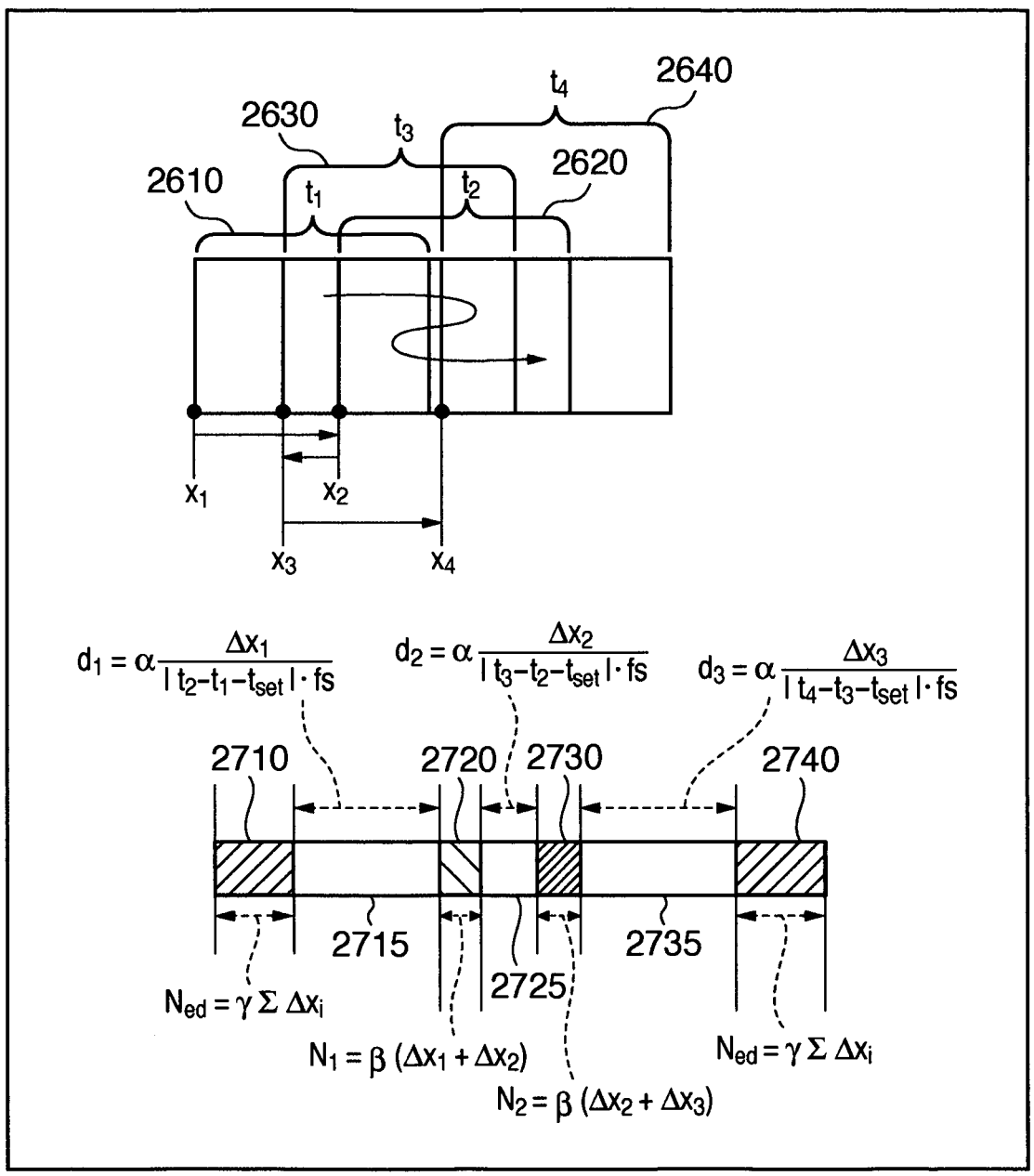
FIG. 9 is a diagram showing another exemplary moving image generating process according to Embodiment 2.

FIG. 9 shows generation of a moving image, where four-division image pickup is performed as in FIG. 8, but a shifting direction is reversed partway through the process.

Specifically, the process of FIG. 9 is different from that of FIG. 8 in that extraction reference positions of original images 2620 and 2630 of original images 2610 through 2640 are reversed. Also in such a case, according to the present invention, an extraction direction for displaying the original images 2620 to 2630 is set to be a direction from $x_2$ to $x_3$. Therefore, as shown in FIG. 9, a moving image can be generated in order of the original images 2610 to 2640 while changing the direction of extraction positions.

Also, since frame images are extracted in order of image pickup, a moving image can be generated which is reproduced and displayed in order of image pickup. Note that reference numerals 2710 through 2740 correspond to reference numerals 1710 through 1740 of FIG. 8, respectively.

Figure 10:
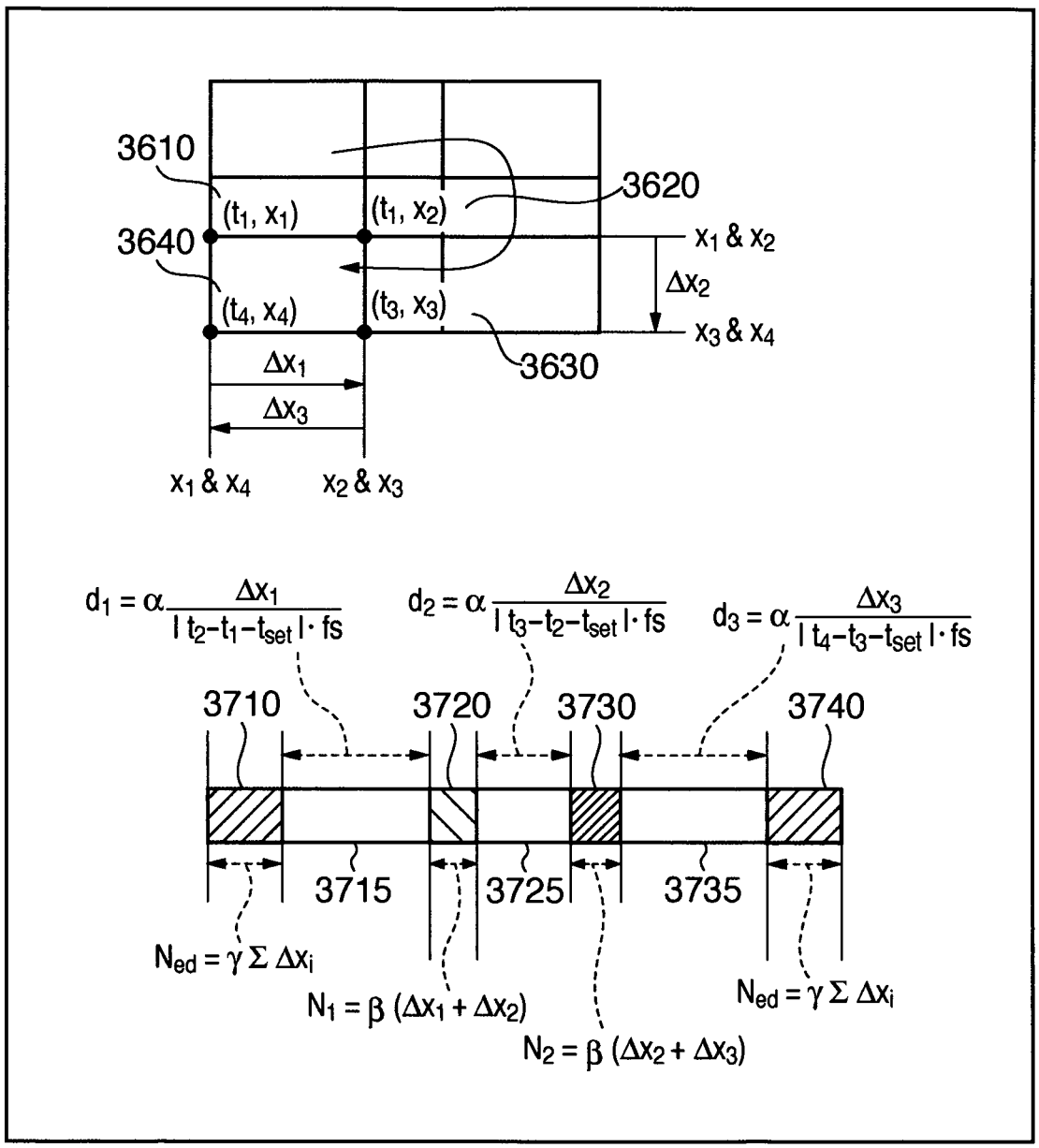
FIG. 10 is a diagram showing still another exemplary moving image generating process according to Embodiment 2.

FIG. 10 shows generation of a moving image, where four-division image pickup is performed as in FIG. 8, but a shifting direction is two-dimensionally changed.

Specifically, when division image pickup is performed from an original image 3610 to an original image 3640 of FIG. 10, extraction reference positions are changed by 90 degrees for each of intermediate original images, so that division image pickup is performed in a large two-dimensional area. Also in this case, an extraction process between two original images can be achieved by the same procedure as that of the above-described workflow (see FIGS. 6 and 7). Note that reference numerals 3710 through 3740 correspond to reference numerals 1710 through 1740 of FIG. 8, respectively.

Also, the synthesis unit 170 may synthesize all picked-up images to generate a single synthesized image before extraction of an initial frame image, or may synthesize only two picked-up images corresponding to an area to be extracted with required timing, to generate a partial synthesized image.

In the latter case, the extraction unit 10 captures a frame image from a partial synthesized image instead of a synthesized image. The temporary storage unit 110 does not have to hold a synthesized image, and may hold a partial synthesized image smaller than the synthesized image. Therefore, the temporary storage unit 110 needs to have only a capacity required to synthesize two original images. Therefore, the process of this embodiment can be executed in a compact device, such as a digital camera or the like, in which the capacity of the temporary storage unit 110 is relatively limited.

As described above, according to this embodiment, even when three or more original images exist, the technique of the present invention can be used as in Embodiment 1.

(Embodiment 3)

In Embodiment 3, when the synthesis unit 170 synthesizes shared portions of two still images, the ratio of synthesis is changed, depending on the extraction position of an image extracted by the extraction unit 10. Specifically, the synthesis unit 170 performs so-called α blending, and changes the value of α, depending on the extraction position of an image extracted by the extraction unit 10. Hereinafter, this will be described with reference to FIGS. 11 and 12.

Figure 11:
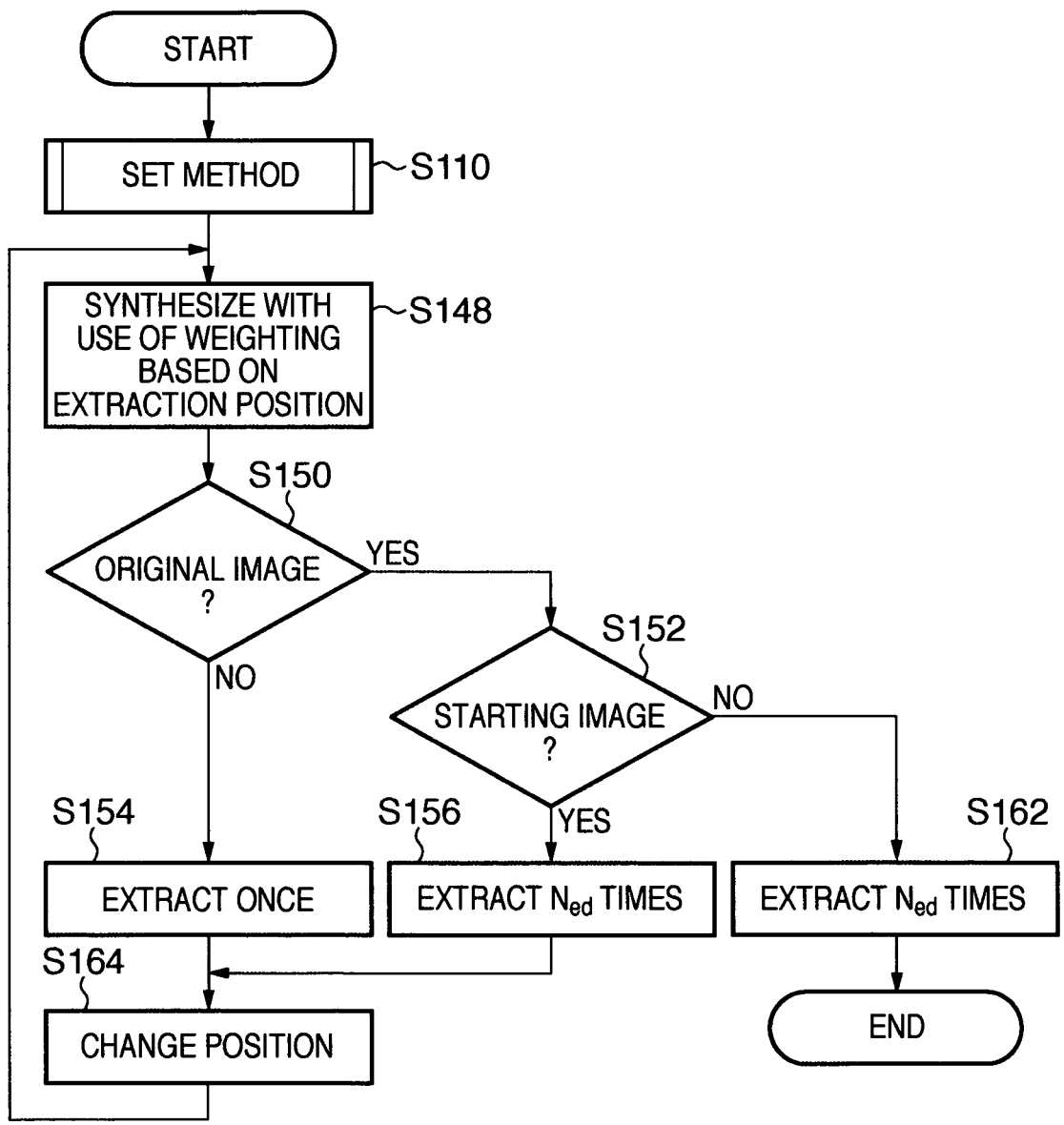
FIG. 11 is a flowchart showing a detailed flow of an image extraction process according to Embodiment 3.

FIG. 11 is a flowchart showing a detailed flow of an image extracting process according to Embodiment 3. In FIG. 11, steps in which processes similar to those of Embodiment 1 are performed are indicated by the same reference numerals and will not be described (see FIG. 1).

In Embodiment 3, as is different from Embodiment 1, S148 is provided before S150. In S148, the synthesis unit 170 synthesizes shared portions of two still images corresponding to an extraction position x, with use of weighting based on the extraction position x, to generate a partial synthesized image.

Figure 12:
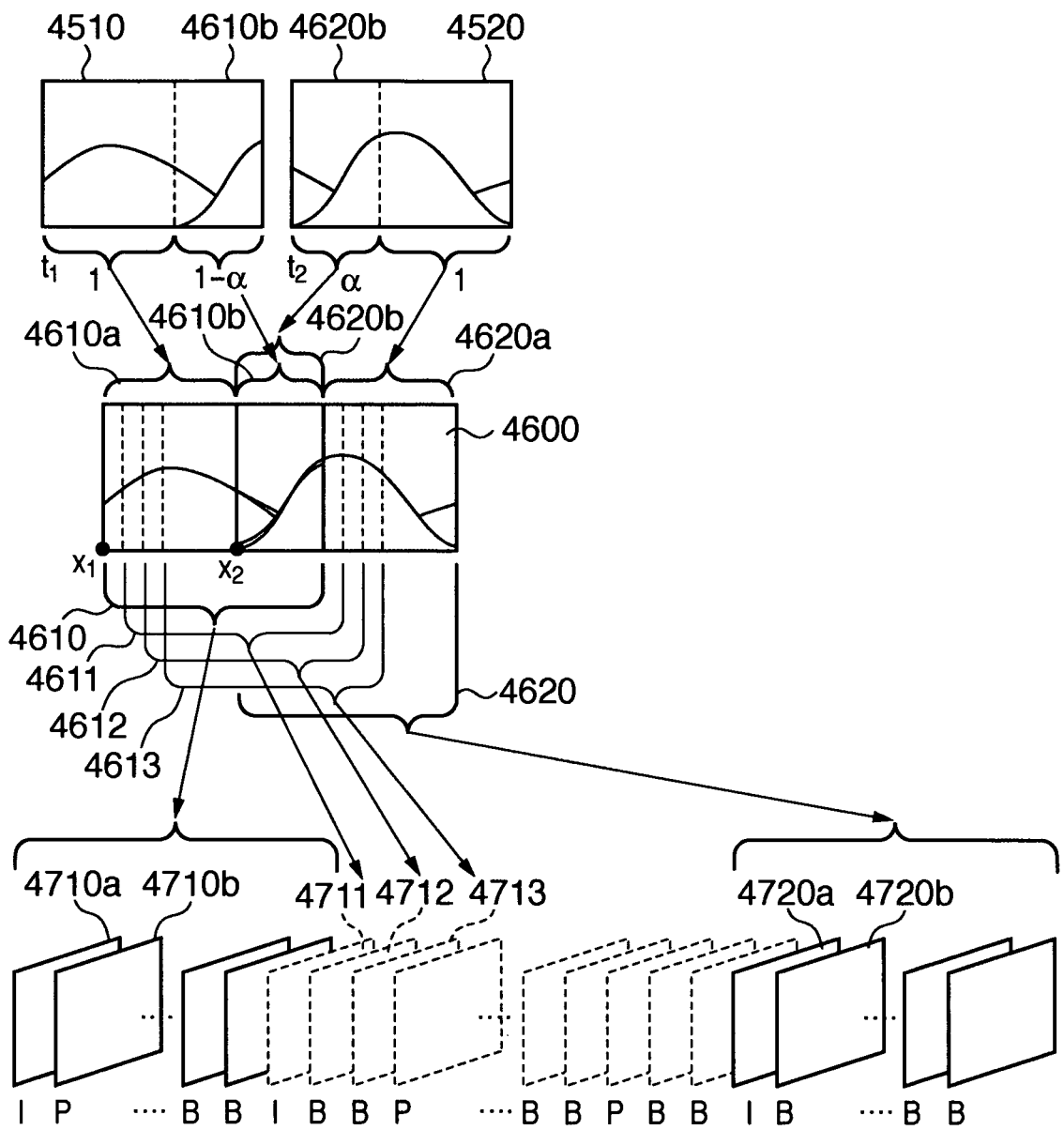
FIG. 12 is a diagram showing an outline of a moving image generating process according to Embodiment 3.

Here, a case shown in FIG. 12 will be described in which a partial synthesized image 4600 is generated from image data 4510 and image data 4520. The image data 4510 and the image data 4520 include shared portions 4610b and 4620b, respectively. The synthesis unit 170 synthesizes shared portions 4610b and 4620b at a ratio of $(1-\alpha):\alpha$ $(0\leq\alpha\leq 1)$. In this case, the synthesis unit 170 puts a higher weight to one of the still images closer to the extraction position (e.g., the image data 4510) (i.e., the value of $\alpha$ is reduced).

Also, when the extraction position corresponds to the area of an original image, the value of $\alpha$ is set to be 0 or 1 so that only the original image is used. For example, when an image is extracted from the extraction position 4610, the value of $\alpha$ is 0. Thereby, a frame image that is extracted from a position corresponding to the area of an original image, is not affected by a deterioration in image quality due to an image distortion or the like during synthesis.

As the extraction position is closer to the extraction position 4620, the synthesis unit 170 sets the value of $\alpha$ to be larger. For example, the value of $\alpha$ may be determined based on the proportion of a current extraction position shift amount $|x-x_1|$ to an extraction reference position spacing $\Delta x_1 = |x_2 - x_1|$. When the extraction position x coincides with $x_1$, $\alpha=0$. When the extraction position x coincides with $x_2$, $\alpha=1$. The value of $\alpha$ is calculated by linear interpolation between these positions. Thus, the value of $\alpha$ is determined, depending on the extraction position.

In this embodiment, the value of $\alpha$ is changed between successive frame images. Therefore, when the compression unit 20 encodes a frame image by a bi-directional predictive coding scheme, the prediction efficiency is improved, so that the code amount is reduced. Also, as shown in FIG. 12, if a portion of a frame image captured from an area different from an original image is intra-frame coded, a moving image can be reproduced in a backward direction or can be reproduced while skipping a frame(s), i.e., a so-called special reproduction mode can be achieved.

The image synthesizing method described above is performed using $\alpha$ blending by pixel addition. However, the image synthesizing method of the present invention is not limited to $\alpha$ blending. For example, there is a technique called morphing that links two similar images by coordinate conversion. A method of linking images of synthesis shared areas of original images in time series using such an image conversion technique may fall within another embodiment of the present invention.

Moreover, as another image synthesizing method, a method of switching images in synthesis shared areas of original images at a predetermined position, and changing the switching positions in time series, may fall within another embodiment of the present invention.

In the case of an imaging synthesizing method employing the $\alpha$ blending technique, the morphing technique or the switching technique, a frame image corresponding to an original image completely matches the original image. In other words, when an image is displayed for a long time, an original image without a distortion can be displayed.

Moreover, there is another method for synthesizing an image in which a distortion occurring in a synthesis shared area portion is reduced and the occurrence of an unnatural discontinuous image is prevented. In this case, since it is not necessary to change a synthesis process in time series, the processing load is reduced. Note that although even an image having a long display time does not completely match an original image, the image is smoothly synthesized, so that unnaturalness can be reduced for a display method employing division image pickup.

Note that, in this embodiment, even when the extraction unit 10 extracts an image from at least one area between predetermined two still images, the synthesis unit 170 generates a separate partial synthesized image for each area.

As described above, according to this embodiment, frame images are captured while changing stepwise a synthesis ratio of shared portions of two still images.

Thereby, the deterioration in image quality of a frame image due to synthesis can be reduced, and the encoding efficiency can be improved.

(Other Embodiment)

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. The storage medium, such as a Floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function expansion card which is inserted into the computer or in a memory provided in a function expansion unit which is connected to the computer. Thereafter, a CPU or the like contained in the function expansion card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-315210, filed on Dec. 5, 2007, which is hereby incorporated by reference herein in its entirety.

The invention claimed is:

1. An image processing apparatus for processing at least two still images, the apparatus comprising:
   an image pick up unit which picks up using a single camera said at least two still images in such a manner that each of said at least two still images picked up by the image pick up unit corresponds to each of at least two divided areas of a subject image and the at least two still images successively picked up have shared portions;
  a synthesis unit which generates a synthesized image from the at least two still images by synthesizing the shared portions;
  an extraction unit which repeatedly extracts a plurality of images from extraction positions of a plurality of different areas in the synthesized image in a manner that at least a last two of the extraction positions coincide with each other, each of the plurality of different areas straddling two adjacent still images across the shared portions; and
  a generation unit which generates a compression-encoded moving image in which the synthesized image is scrolled and displayed, by compression-encoding, by use of inter-frame prediction, the plurality of images extracted by the extraction unit from the plurality of different areas in the synthesized image.

2. The image processing apparatus according to claim 1, wherein
  the synthesis unit generates a partial synthesized image from the two adjacent still images by synthesizing the shared portions for each of combinations of the two adjacent still images, instead of generation of the synthesized image, and
  the extraction unit extracts the plurality of images from a plurality of different areas in each piece of the partial synthesized images instead of the synthesized image.

3. The image processing apparatus according to claim 2, wherein
  the synthesis unit generates the partial synthesized image by synthesizing the shared portions of the two adjacent still images in such a manner that as an area from which the extraction unit extracts an image being closer to one of the two adjacent still images, a higher weight is put to said one of the two adjacent still images.

4. The image processing apparatus according to claim 1, wherein
  the generation unit generates the compression-encoded moving image so that the plurality of extracted images are arranged to be scrolled and displayed in one direction from an area corresponding to a previously picked-up still image to an area corresponding to a subsequently picked-up still image.

5. The image processing apparatus according to claim 4, wherein
  the generation unit generates the compression-encoded moving image, by using image pickup time included in Exif information of the still images, so that the plurality of extracted images extracted from all areas of the synthesized image are arranged in order in which the corresponding still images were picked up.

6. The image processing apparatus according to claim 1, wherein
  the extraction unit extracts the plurality of images from a larger number of different areas straddling the two adjacent still images across the shared portions as an interval of image pickup time increases, for each of combinations of the two still images.

7. The image processing apparatus according to claim 1, wherein
  the generation unit performs intra-frame coding with respect to the extracted image used as an initial frame image and inter-frame predictive coding or bi-directional predictive coding with respect to the remaining extracted images, of the plurality of extracted images, to generate the compression-encoded moving image.

8. A method for controlling an image processing apparatus which processes at least two still images, the method comprising:
  picking up said at least two still images by an image pick up unit using a single camera in such a manner that each of said at least two still images picked up by the image pick up unit corresponds to each of at least two divided areas of a subject image and the at least two still images successively picked up have shared portions;
  generating a synthesized image from the at least two still images by synthesizing the shared portions;
  repeatedly extracting a plurality of images from extraction positions of a plurality of different areas in the synthesized image in a manner that at least a last two of the extraction positions coincide with each other, each of the plurality of different areas straddling two adjacent still images across the shared portions; and
  generating a compression-encoded moving image in which the synthesized image is scrolled and displayed, by compression-encoding, by use of inter-frame prediction, the plurality of images extracted by the extracting from the plurality of different areas in the synthesized image.

9. A non-transitory computer-readable storage medium storing a computer program, the program causes an image processing apparatus which processes at least two still images, to function as:
  an image pick up unit which picks up using a single camera said at least two still images in such a manner that each of said at least two still images picked up by the image pick up unit corresponds to each of at least two divided areas of a subject image and the at least two still images successively picked up have shared portions;
  a synthesis unit which generates a synthesized image from the at least two still images by synthesizing the shared portions;
  an extraction unit which repeatedly extracts a plurality of images from extraction positions of a plurality of different areas in the synthesized image in a manner that at least a last two of the extraction positions coincide with each other, each of the plurality of different areas straddling two adjacent still images across the shared portions; and
  a generation unit which generates a compression-encoded moving image in which the synthesized image is scrolled and displayed, by compression-encoding, by use of inter-frame prediction, the plurality of images extracted by the extraction unit from the plurality of different areas in the synthesized image.

10. An image processing apparatus for capturing a plurality of frame images from at least two still images, the apparatus comprising:
  an image pick up unit which picks up using a single camera said at least two still images in such a manner that each of said at least two still images picked up by the image pick up unit corresponds to each of at least two divided areas of a subject image and the at least two still images successively picked up have shared portions;
  a temporary storage unit which stores the at least two still images;
  an extraction unit which, for each of combinations of two adjacent still images across the shared portions, of the at least two still images, repeatedly extracts a plurality of images from extraction positions of a plurality of different areas in the two adjacent still images in a manner that at least a last two of the extraction positions coincide with each other, each of the plurality of different areas straddling the two adjacent still images across the shared portions of the two adjacent still images; and a generation unit which generates a compression-encoded moving image in which the two adjacent still images are scrolled and displayed, by compression-encoding, by use of inter-frame prediction, the plurality of images extracted by the extraction unit from the plurality of different areas in the two adjacent still images for each of combinations of two adjacent still images.

11. A method for controlling an image processing apparatus for capturing a plurality of frame images from at least two still images, the method comprising:

picking up said at least two still images by an image pick up unit using a single camera in such a manner that each of said at least two still images picked up by the image pick up unit corresponds to each of at least two divided areas of a subject image and the at least two still images successively picked up have shared portions;

storing temporarily the at least two still images;

for each of combinations of two adjacent still images across the shared portions, of the at least two still images, repeatedly extracting a plurality of images from extraction positions of a plurality of different areas in the two adjacent still images in a manner that at least a last two of the extraction positions coincide with each other, each of the plurality of different areas straddling the two adjacent still images across the shared portions of the two adjacent still images; and generating a compression-encoded moving image in which the two adjacent still images are scrolled and displayed, by compression-encoding, by use of inter-frame prediction, the plurality of images extracted by the extraction unit from the plurality of different areas in the two adjacent still images for each of combinations of two adjacent still images.

12. A non-transitory computer-readable storage medium storing a computer program for causing an image processing apparatus for capturing a plurality of frame images from at least two still images, to function as:

an image pick up unit which picks up using a single camera said at least two still images in such a manner that each of said at least two still images picked up by the image pick up unit corresponds to each of at least two divided areas of a subject image and the at least two still images successively picked up have shared portions;

a temporary storage unit which stores the at least two still images;

an extraction unit which, for each of combinations of two adjacent still images across the shared portions, of the at least two still images, repeatedly extracts a plurality of images from extraction positions of a plurality of different areas in the two adjacent still images in a manner that at least a last two of the extraction positions coincide with each other, each of the plurality of different areas straddling the two adjacent still images across the shared portions of the two adjacent still images; and a generation unit which generates a compression-encoded moving image in which the two adjacent still images are scrolled and displayed, by compression-encoding, by use of inter-frame prediction, the plurality of images extracted by the extraction unit from the plurality of different areas in the two adjacent still images for each of combinations of two adjacent still images.

13. The image processing apparatus according to claim 1, wherein:

the extraction unit extracts, a plurality of times, an image from an area corresponding to one of said at least two still images in the synthesized image; and the generation unit generates the compression-encoded moving image by arranging, in sequence, a plurality of images extracted from the area corresponding to one of said at least two still images in the synthesized image.

14. The image processing apparatus according to claim 10, wherein the generation unit generates the compression-encoded moving image by arranging, as a starting image, one of said two adjacent still images a plurality of times in sequence and arranging, as a final image, the other one of said two adjacent still images a plurality of times in sequence such that the starting image and the final image are displayed for a longer time.

15. The image processing apparatus according to claim 1, wherein only the extraction positions of the plurality of different areas moved from the at least two still images to the synthesized image are generated as the compression-encoded moving image.

16. The image processing apparatus according to claim 1, wherein the extraction unit repeatedly extracts the plurality of images from the extraction positions of the plurality of different areas in the synthesized image until the at least last two of the extraction positions coincide with each other.

17. The image processing apparatus according to claim 1, wherein the plurality of different areas straddling the two adjacent still images across the shared portion exclude the at least two still images.

18. The image processing method according to claim 8, wherein the plurality of different areas straddling the two adjacent still images across the shared portion exclude the at least two still images.

19. The non-transitory computer-readable storage medium according to claim 9, wherein the plurality of different areas straddling the two adjacent still images across the shared portion exclude the at least two still images.

20. The image processing apparatus according to claim 10, wherein the plurality of different areas straddling the two adjacent still images across the shared portion exclude the at least two still images.

21. The image processing method according to claim 11, wherein the plurality of different areas straddling the two adjacent still images across the shared portion exclude the at least two still images.

22. The non-transitory computer-readable storage medium according to claim 12, wherein the plurality of different areas straddling the two adjacent still images across the shared portion exclude the at least two still images.

* * * * *